United States Patent
Sugimoto

(10) Patent No.: US 9,676,234 B2
(45) Date of Patent: *Jun. 13, 2017

(54) STRIP, METHOD FOR MANUFACTURING THE SAME, AND METHOD FOR MANUFACTURING PNEUMATIC TIRE

(75) Inventor: Mutsuki Sugimoto, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/885,834

(22) PCT Filed: Jun. 17, 2011

(86) PCT No.: PCT/JP2011/063937
§ 371 (c)(1),
(2), (4) Date: May 16, 2013

(87) PCT Pub. No.: WO2012/077372
PCT Pub. Date: Jun. 14, 2012

(65) Prior Publication Data
US 2013/0230697 A1    Sep. 5, 2013

(30) Foreign Application Priority Data

Dec. 6, 2010   (JP) ................... 2010-271405
Jun. 3, 2011   (JP) ................... 2011-125165

(51) Int. Cl.
*B60C 5/14*   (2006.01)
*B29D 30/16*   (2006.01)
(Continued)

(52) U.S. Cl.
CPC ............ *B60C 5/14* (2013.01); *B29D 30/10* (2013.01); *B29D 30/1621* (2013.01);
(Continued)

(58) Field of Classification Search
CPC ............ B29D 30/3028; B29D 30/1628; B29D 2030/0682; B29D 2030/008; B60C 2005/145; B60C 2005/147
See application file for complete search history.

(56) References Cited

U.S. PATENT DOCUMENTS 2,851,729 A    9/1958 Kalkofen
3,143,155 A    8/1964 Knox
(Continued)

FOREIGN PATENT DOCUMENTS

CH    FR 2916679 A1 * 12/2008    ......... B29D 30/0681
CN    101432150 A    5/2009
(Continued)

OTHER PUBLICATIONS

Machine translation of JP 2008/127443A, obtained from Industrial Property Digital Library of the JPO on Jun. 23, 2016.*
(Continued)

*Primary Examiner* — Aaron Austin
*Assistant Examiner* — Zheren J Yang
(74) *Attorney, Agent, or Firm* — Birch, Stewart, Kolasch & Birch, LLP

(57) ABSTRACT

The strip is formed of a single layer including a first layer arranged in a tire innermost layer or composite layers of the first layer and a second layer disposed adjacently to a carcass ply and made of a thermoplastic elastomer composition. The first layer is a thermoplastic elastomer composition containing a styrene-isobutylene-styrene block copolymer and a tackifier, a butyl-based rubber and a natural rubber. The strip has a strip main body having a thickness (T1) of 0.02 to 1.0 mm and ear portions formed on opposite sides of the strip main body. The ear portions have a thickness (T2) smaller than the thickness (T1) and a width (W2) of 0.5 mm to 5.0 mm.

18 Claims, 8 Drawing Sheets

(51) Int. Cl.
| | |
|---|---|
| *B29D 30/30* | (2006.01) |
| *B29D 30/10* | (2006.01) |
| *B60C 1/00* | (2006.01) |
| *C08L 23/22* | (2006.01) |
| *C08L 7/00* | (2006.01) |
| *C08L 53/00* | (2006.01) |
| *B29D 30/06* | (2006.01) |

(52) U.S. Cl.
CPC ..... *B29D 30/1628* (2013.01); *B29D 30/3028* (2013.01); *B60C 1/0008* (2013.04); *C08L 7/00* (2013.01); *C08L 23/22* (2013.01); *C08L 53/00* (2013.01); *B29D 2030/0682* (2013.01); *B29D 2030/1678* (2013.01); *B60C 2005/145* (2013.04); *B60C 2005/147* (2013.04); *Y10T 428/24488* (2015.01)

(56) References Cited

U.S. PATENT DOCUMENTS

| | | | |
|---|---|---|---|
| 3,414,036 A | 12/1968 | Skidmore | |
| 4,286,643 A * | 9/1981 | Chemizard | B29D 30/0685 152/505 |
| 4,387,175 A | 6/1983 | Bohm et al. | |
| 4,542,466 A | 9/1985 | Arimatsu | |
| 4,910,321 A | 3/1990 | Kennedy et al. | |
| 4,946,899 A | 8/1990 | Kennedy et al. | |
| 5,219,948 A | 6/1993 | Storey et al. | |
| 5,350,819 A | 9/1994 | Shaffer | |
| 5,428,111 A | 6/1995 | Faust et al. | |
| 5,506,316 A | 4/1996 | Shaffer | |
| 5,548,029 A | 8/1996 | Powers et al. | |
| 5,660,656 A | 8/1997 | Herbelleauu et al. | |
| 5,851,323 A | 12/1998 | Kaido et al. | |
| 5,992,486 A | 11/1999 | Katsuki et al. | |
| 6,028,147 A | 2/2000 | Ogawa et al. | |
| 6,079,465 A | 6/2000 | Takeyama et al. | |
| 6,328,084 B1 | 12/2001 | Caretta et al. | |
| 6,331,591 B1 | 12/2001 | Miyamoto et al. | |
| 6,334,919 B1 | 1/2002 | Takeyama et al. | |
| 6,462,131 B1 | 10/2002 | Tse et al. | |
| 6,576,077 B1 * | 6/2003 | Mitsuhashi | B29C 47/0019 156/117 |
| 7,347,239 B2 | 3/2008 | Yukawa et al. | |
| 7,681,613 B2 | 3/2010 | Yukawa et al. | |
| 8,201,603 B2 | 6/2012 | Matsuda et al. | |
| 8,616,255 B2 * | 12/2013 | Sugimoto | B29D 30/0681 152/510 |
| 8,646,500 B2 | 2/2014 | Custodero et al. | |
| 8,893,756 B2 | 11/2014 | Sugimoto et al. | |
| 2002/0056498 A1 | 5/2002 | Caretta et al. | |
| 2002/0066512 A1 * | 6/2002 | Narahara | B60C 1/0008 152/510 |
| 2002/0197497 A1 | 12/2002 | Gipson | |
| 2004/0024126 A1 | 2/2004 | Tsou et al. | |
| 2004/0031550 A1 | 2/2004 | Kanenari et al. | |
| 2005/0061412 A1 * | 3/2005 | Noto | B29D 30/0681 152/510 |
| 2006/0042737 A1 | 3/2006 | Hayashi et al. | |
| 2006/0096690 A1 | 5/2006 | Nakata | |
| 2006/0096696 A1 | 5/2006 | Oku et al. | |
| 2007/0144658 A1 | 6/2007 | Miki et al. | |
| 2008/0020203 A1 | 1/2008 | Tabata | |
| 2008/0156407 A1 * | 7/2008 | Sakamoto | B29C 53/581 152/454 |
| 2008/0190540 A1 * | 8/2008 | Hashimura | B29D 30/0681 152/548 |
| 2008/0214717 A1 | 9/2008 | Yao et al. | |
| 2008/0223508 A1 * | 9/2008 | Hirai | B29D 30/16 156/117 |
| 2008/0249236 A1 * | 10/2008 | Nakashima | C03C 27/10 524/577 |
| 2008/0275184 A1 * | 11/2008 | Karato | B60C 1/0008 525/105 |
| 2008/0286571 A1 | 11/2008 | Ichimura et al. | |
| 2008/0314492 A1 * | 12/2008 | Tsou | B32B 7/12 152/510 |
| 2008/0314505 A1 * | 12/2008 | Nishitani | B29D 30/3028 156/123 |
| 2009/0038727 A1 | 2/2009 | Hong | |
| 2009/0151841 A1 | 6/2009 | Jones et al. | |
| 2009/0165914 A1 * | 7/2009 | Tomoi | 152/510 |
| 2009/0218024 A1 | 9/2009 | Tsou et al. | |
| 2009/0229738 A1 | 9/2009 | Lo Presti et al. | |
| 2009/0291298 A1 | 11/2009 | Robert et al. | |
| 2009/0311548 A1 | 12/2009 | Kirino | |
| 2009/0320985 A1 | 12/2009 | Kudo et al. | |
| 2010/0012242 A1 | 1/2010 | Kudo et al. | |
| 2010/0024941 A1 | 2/2010 | Hara et al. | |
| 2010/0032070 A1 * | 2/2010 | Albert | B29C 73/20 152/504 |
| 2010/0051158 A1 | 3/2010 | Albert et al. | |
| 2010/0071823 A1 | 3/2010 | Tomoi | |
| 2010/0126646 A1 | 5/2010 | Kudo et al. | |
| 2010/0126647 A1 * | 5/2010 | Hashimura | B29D 30/0681 152/510 |
| 2010/0175804 A1 * | 7/2010 | Lesage | B29D 30/0681 152/511 |
| 2010/0178444 A1 * | 7/2010 | Mafune | B29D 30/3021 428/37 |
| 2010/0181003 A1 | 7/2010 | Inoue | |
| 2010/0263778 A1 | 10/2010 | Lesage et al. | |
| 2010/0294411 A1 * | 11/2010 | Custodero | B60C 1/0008 152/511 |
| 2010/0314020 A1 | 12/2010 | Matsuda et al. | |
| 2010/0331473 A1 | 12/2010 | Miyazaki | |
| 2011/0000603 A1 | 1/2011 | Hashimura et al. | |
| 2011/0011511 A1 * | 1/2011 | Miyazaki | B60C 1/0008 152/564 |
| 2011/0024015 A1 * | 2/2011 | Takahashi | B60C 1/0008 152/510 |
| 2011/0056604 A1 | 3/2011 | Sugimoto | |
| 2011/0060082 A1 | 3/2011 | Sugimoto | |
| 2011/0120612 A1 | 5/2011 | Nemoto | |
| 2011/0180193 A1 | 7/2011 | Custodero et al. | |
| 2012/0003409 A1 * | 1/2012 | Lesage | C08L 53/00 428/35.7 |
| 2012/0003413 A1 * | 1/2012 | Lesage | B29D 30/0681 428/36.6 |
| 2012/0006459 A1 * | 1/2012 | Sugimoto | B60C 1/0008 152/450 |
| 2012/0048441 A1 | 3/2012 | Takahashi et al. | |
| 2012/0118463 A1 * | 5/2012 | Lesage | B29C 73/163 152/502 |
| 2012/0214933 A1 * | 8/2012 | Lopez | B60C 1/0016 524/502 |
| 2012/0234449 A1 * | 9/2012 | Greiveldinger | B29C 73/163 152/502 |
| 2013/0192745 A1 | 8/2013 | Sugimoto | |
| 2013/0199687 A1 | 8/2013 | Sugimoto | |
| 2015/0034227 A1 | 2/2015 | Tsou et al. | |
| 2016/0016432 A1 | 1/2016 | Hashimura et al. | |

FOREIGN PATENT DOCUMENTS

| | | |
|---|---|---|
| CN | 101511610 A | 8/2009 |
| CN | 101743135 A | 6/2010 |
| CN | 101754866 A | 6/2010 |
| CN | 102009511 A | 4/2011 |
| CN | 102010561 A | 4/2011 |
| CN | 102311607 A | 1/2012 |
| EP | 0 206 756 A2 | 12/1986 |
| EP | 0 265 053 A2 | 4/1988 |
| EP | 0 397 081 A2 | 11/1990 |
| EP | 0 582 196 A1 | 2/1994 |
| EP | 0 664 231 A1 | 7/1995 |
| EP | 0 664 232 A1 | 7/1995 |
| EP | 0 664 233 A1 | 7/1995 |
| EP | 0 928 702 A1 | 7/1999 |
| EP | 1 674 432 A1 | 6/2006 |
| EP | 1 798 075 A2 | 6/2007 |

(56) References Cited

FOREIGN PATENT DOCUMENTS

| | | | |
|---|---|---|---|
| EP | 2 103 452 A1 | 9/2009 | |
| EP | 2 172 349 A1 | 4/2010 | |
| EP | 2 404 766 A1 | 1/2012 | |
| FR | 2 917 010 A1 | 12/2008 | |
| FR | 2 918 669 A1 | 1/2009 | |
| FR | 2 939 076 A1 | 6/2010 | |
| FR | WO 2010063427 A1 * | 6/2010 | ......... B29D 30/0681 |
| JP | 35-5479 | 3/1960 | |
| JP | 62-48704 A | 3/1987 | |
| JP | 7-215007 A | 3/1989 | |
| JP | 64-62308 A | 3/1989 | |
| JP | 3-174403 A | 7/1991 | |
| JP | 6-107896 A | 4/1994 | |
| JP | 6-143288 A | 5/1994 | |
| JP | 61-43288 A | 5/1994 | |
| JP | 8-217922 A | 8/1996 | |
| JP | 9-19987 A | 1/1997 | |
| JP | 9-165469 A | 6/1997 | |
| JP | 10-508888 A | 9/1998 | |
| JP | 11-254446 A | 9/1999 | |
| JP | 11-254906 A | 9/1999 | |
| JP | 2000-79643 A | 3/2000 | |
| JP | 2000-254980 A | 9/2000 | |
| JP | 2000-317940 A | 11/2000 | |
| JP | 2002-96610 A | 4/2002 | |
| JP | 2003-71844 | 3/2003 | |
| JP | 2003-071844 A | 3/2003 | |
| JP | 2005-238799 A | 9/2005 | |
| JP | 2005-280260 A | 10/2005 | |
| JP | 2005-344030 A | 12/2005 | |
| JP | 2006-062196 A | 3/2006 | |
| JP | 2006-160236 A | 6/2006 | |
| JP | 2006-297733 A | 11/2006 | |
| JP | 2007-083656 A | 4/2007 | |
| JP | 2007-176088 A | 7/2007 | |
| JP | 2007-291256 A | 11/2007 | |
| JP | 2007-296916 A | 11/2007 | |
| JP | 2007326909 A * | 12/2007 | |
| JP | 2008-012751 A | 1/2008 | |
| JP | 2008-126509 A | 6/2008 | |
| JP | 2008-127443 A | 6/2008 | |
| JP | 2008127443 A * | 6/2008 | |
| JP | 2009-990 A | 1/2009 | |
| JP | 2009-513436 A | 4/2009 | |
| JP | 2009-143169 A | 7/2009 | |
| JP | 2009-149711 A | 7/2009 | |
| JP | 2009-220460 A | 10/2009 | |
| JP | 2009-227124 A | 10/2009 | |
| JP | 2010-13646 A | 1/2010 | |
| JP | 2010-058437 A | 3/2010 | |
| JP | 2010-507510 A | 3/2010 | |
| JP | 2010-513121 A | 4/2010 | |
| JP | 2010-100082 A | 5/2010 | |
| JP | 2010-100675 A | 5/2010 | |
| JP | 2010-162825 A | 7/2010 | |
| JP | 2010-527839 A | 8/2010 | |
| JP | 2010-528919 A | 8/2010 | |
| JP | 2010-195969 A | 9/2010 | |
| JP | 2010-532801 A | 10/2010 | |
| JP | 2011-051320 A | 3/2011 | |
| JP | 2011-057788 A | 3/2011 | |
| JP | 2011 074309 A | 4/2011 | |
| JP | 2012-510389 A | 5/2012 | |
| JP | 2012-111224 A | 6/2012 | |
| WO | WO 96/15156 A1 | 5/1996 | |
| WO | WO 02/100153 A2 | 12/2002 | |
| WO | WO 03/029029 A1 | 4/2003 | |
| WO | WO 2005/033035 A1 | 4/2005 | |
| WO | WO 2006/001680 A1 | 1/2006 | |
| WO | WO 2006/046354 A1 | 5/2006 | |
| WO | WO 2006/132238 A1 | 12/2006 | |
| WO | WO 2007/013161 A1 | 2/2007 | |
| WO | WO 2007/050061 A1 | 5/2007 | |
| WO | WO 2007/126143 A | 11/2007 | |
| WO | WO 2008/007420 A1 | 1/2008 | |
| WO | WO 2008/029779 A1 | 3/2008 | |
| WO | WO 2008/029781 A1 | 3/2008 | |
| WO | WO 2008/087776 A1 | 7/2008 | |
| WO | WO 2008/145276 A1 | 12/2008 | |
| WO | WO 2008/145277 A1 | 12/2008 | |
| WO | WO 2008/154996 A1 | 12/2008 | |
| WO | WO 2009/007064 A1 | 1/2009 | |
| WO | WO 2009/044652 A1 | 4/2009 | |
| WO | WO 2009/078317 A1 | 6/2009 | |
| WO | WO 2009/119232 | 10/2009 | |
| WO | WO 2009/156049 A1 | 12/2009 | |
| WO | WO 2010/063425 A1 | 6/2010 | |
| WO | WO 2010/063426 A1 | 6/2010 | |
| WO | WO 2010/063427 A1 | 6/2010 | |
| WO | WO 2010063427 A1 * | 6/2010 | |
| WO | WO 2010/119668 A1 | 10/2010 | |
| WO | WO 2010/143094 A1 | 12/2010 | |

OTHER PUBLICATIONS

Japanese Office Action and English translation thereof, dated Sep. 10, 2013, for Patent Application No. 2012-155339.
Chinese Office Action and Search Report, dated Feb. 17, 2015, for Chinese Application No. 201180058436.0, including an English translation of Chinese Office Action.
Chinese Office Action and Chinese Search Report, issued Mar. 23, 2015, for Chinese Application No. 201180052344.1, along with English translations.
Dexco Polymer, "VECTOR 4211 Styrene-Isoprene-Styrene (SIS) Block Copolymer," Apr. 2012, 2 pages.
Ineos Oligomers, "Indopol Polybutene, Delivering Value Through Versatility," Product Bulletin, Nov. 30, 2009, 35 pages, XP-55147638A.
International Search Report (form PCT/ISA/210), issued Aug. 16, 2011, for International Application No. PCT/JP2011/062491.
Japanese Notice of Allowance, issued Feb. 18, 2014 for Japanese Application No. 2012-095514, along with an English translation.
Japanese Office Action, issued Jul. 2, 2013, for Japanese Application No. 2012-095514, along with an Enligsh translation.
Kaneka, "SIBSTAR® Thermoplastic Elastomer, 'Wholly Saturated', Styrene-Isobutylene Block Copolymer," Oct. 4, 2007, 2 pages.
Koshimura et al., "Application Study of Styrene-isobutylene-styrene Block Copolymer as a New Thermoplastic Elastomer," Polymer Bulletin, vol. 29, 1992, pp. 705-711, XP-002608737A.
Kraton Polymers, "Grade Range," Apr. 2001, 10 pages.
Kraton, "Fiche de donnees de securite. Produits de la gamme styrene-isoprene-styrene"; Kraton Polymers, Feb. 2, 2009; (Cited in European Notice of Opposition, issued Apr. 25, 2013), pp. 1-8.
Puskas et al., "The Effect of Hard and Soft Segment Composition and Molecular Architecture on the Morphology and Mechanical Properties of Polystyrene-polyisobutylene Thermoplastic Elastomeric Block Copolymers," European Polymer Journal, vol. 39, 2003, pp. 2041-2049, XP-4455628A.
Chinese Office Action and Chinese Search Report, issued Feb. 23, 2016, for Chinese Application No. 201180052344.1, along with an English translation of the Chinese Office Action.
European Notice of Opposition, issued Apr. 25, 2013, for European Application No. 10006601.8.
Extended European Search Report, issued Nov. 24, 2010, for European Application No. 10006601.8.
Japanese Office Action, issued Aug. 23, 2011, for Japanese Application No. 2009-205039, along with an English translation.
Chinese Office Action and Search Report, dated Feb. 28, 2015, for Chinese Application No. 201180059180.5, with an English translation of the Office Action.
Chinese Office Action and Search Report, dated Nov. 27, 2015, for Chinese Application No. 201280045035.6, with an English translation of the Office Action.
English machine translation of JP 2000-317940 A, Nov. 21, 2000.
English machine translation of JP 2007-83656 A, Apr. 5, 2007.
Extended European Search Report issued May 28, 2015, in European Patent Application No. 11819650.0.

(56) References Cited

OTHER PUBLICATIONS

International Search Report (Form PCT/ISA/210), dated Aug. 16, 2011, for International Application No. PCT/JP2011/062491.
International Search Report (Form PCT/ISA/210), dated Oct. 9, 2012, for International Application No. PCT/JP2012/067450.
International Search Report (Form PCT/ISA/210), dated Sep. 13, 2011, for International Application No. PCT/JP2011/063937.
International Search Report (Form PCT/ISA/210), dated Sep. 13, 2011, for International Application No. PCT/JP2011/063938.
International Search Report for PCT/JP2011/063935 dated Sep. 13, 2011.
International Search Report issued Aug. 30, 2011, in PCT International Application No. PCT/JP2011/062489.
Japanese Notice of Allowance and English translation thereof, dated Feb. 18, 2014, for Japanese Application No. 2012-095514.
Japanese Office Action and English translation thereof, dated Aug. 23, 2011, for Japanese Application No. 2009-205039.
Japanese Office Action and English translation thereof, dated Jul. 2, 2013, for Japanese Application No. 2012-095514.
Japanese Office Action and English translation thereof, dated May 8, 2012, for Japanese Application No. 2010-273524.
Japanese Office Action and English translation thereof, dated Oct. 1, 2013, for Japanese Application No. 2011-210970.
Japanese Office Action and English translation thereof, dated Oct. 23, 2012, for Japanese Application No. 2010-273524.
Japanese Office Action dated May 29, 2012, for Application No. 2010-236045 with the English translation.
Machine generated English language translation of JP 06-107896 (original document dated Jun. 1994).
Machine translation of JP-2008-127443-A, dated Jun. 5, 2008.
Machine-generated English language translation of JP 2003-71844 (original document dated 2005-071844).
Notice of Grounds of Rejection mailed Aug. 23, 2011, in Japanese Patent Application No. 2010-188568, with English translation.
Notice of Grounds of Rejection mailed Aug. 23, 2011, in Japanese Patent Application No. 2010-270473, with English translation.
Office Action issued in Japanese Application 2011-125168 mailed May 8, 2012.
Office Action issued in Japanese Application 2011-125168 mailed Oct. 23, 2012.
Office Action issued in Japanese Application 2011-125168 mailed Sep. 6, 2011.
Search Report for European Application No. 11 00 2977 dated Oct. 19, 2011.
The Adhesion Between Polymers, H.R. Brown, Annu. Rev. Mater. Sci. 1991; pp. 463-489.
International Search Report issued in PCT/JP2011/063937 mailed Sep. 13, 2011.
Questioning issued in Japanese patent application No. 2011-125165 mailed Oct. 23, 2012.
Translated Supplementary European Search Report issued in Application No. 11846673.9 dated Oct. 26, 2016.
Japanese Office Action dated Jun. 25, 2013 for Japanese Application No. 2012-155339 with English translation.

\* cited by examiner (a)

(b)

(a)

(b)

(c)

(d)

STRIP, METHOD FOR MANUFACTURING THE SAME, AND METHOD FOR MANUFACTURING PNEUMATIC TIRE

TECHNICAL FIELD

The present invention relates to a strip for an inner liner used for a pneumatic tire, a method for manufacturing the strip, and a method for manufacturing a pneumatic tire including the strip.

BACKGROUND ART

In recent years, in response to strong social demands for low fuel consumption of vehicles, weight reduction of tires has been sought. Among tire members, weight reduction and the like of an inner liner also have begun. The inner liner is disposed inwardly in a tire, and has a function of reducing an amount of leakage of air from inside to outside of the pneumatic tire.

Currently, a rubber composition for such an inner liner employs, for example, a rubber blend mainly containing a butyl rubber. The rubber blend contains the butyl rubber by 70 mass % to 100 mass %, and a natural rubber by 30 mass % to 0 mass %. In this way, the tire is provided with improved air permeability resistance. In addition to butylene, the rubber blend mainly containing the butyl rubber contains isoprene by approximately 1 mass %, which acts with sulfur, vulcanization accelerator, and zinc white to achieve cross-linking between rubber molecules. In the case of normal blend, the above-described butyl-based rubber needs to have a thickness of 0.6 mm to 1.0 mm for a tire of a passenger car, and needs to have a thickness of approximately 1.0 mm to 2.0 mm for a tire of a truck/bus. In order to achieve weight reduction of such tires, use of polymer, which is more excellent in air permeability resistance than the butyl-based rubber and can provide an inner liner layer with a thinner thickness, has been requested.

Patent Literature 1 (Japanese Patent Laying-Open No. 7-215007) and Patent Literature 2 (Japanese Patent Laying-Open No. 11-254906) each propose a method for manufacturing a pneumatic tire including a core body having an outer circumferential surface resembling the inner surface shape of a tire when internal pressure is applied thereto in order to prevent uniformity of the tire from degrading. It is proposed that an unvulcanized tire is molded by sequentially applying an inner liner, a carcass ply, an unextended bead, a belt, a tread rubber, a side wall rubber, and the like to the outside of the core body. Then, the unvulcanized tire removed from the core body or the unvulcanized tire with the core body is input into a vulcanization press to be subjected to vulcanization, thereby improving uniformity of the tire.

Conventionally, in order to achieve weight reduction of a tire, it has been proposed to use a film made of a material including thermoplastic resin, instead of the above-described rubber composition. However, when a tire is manufactured using an inner liner of thin thermoplastic resin, the inner liner partially becomes too thin due to pressure in a vulcanization step, with the result that the finishing gauge of the inner liner in the resulting tire product becomes thinner than the designed gauge. In the thin portion of the inner liner thus finished, a phenomenon (open thread) in which a carcass cord looks to stand out takes place, thus giving a user an impression of bad inner appearance. In addition, when the inner liner is thin, gas barrier property becomes partially bad to decrease tire internal pressure, with the result that the tire may burst in the worst case.

A thermoplastic resin composition having excellent gas barrier property has low tackiness to the core body, and particularly, has a small curvature R from a position in the vicinity of the bead portion to a position in the vicinity of a buttress portion on the outer circumferential surface of the core body. Thus, it cannot be adhered to such a structure that is to be stuck on a side surface to maintain tackiness. Furthermore, tackiness is low at places where portions of the thermoplastic resin composition having excellent gas barrier property overlap one another to form a strip structure, and the composition is loosened when it is wound around the core body.

Meanwhile, during traveling with the tire, large shear strain acts on a vicinity of a shoulder portion in the inner liner. When the material including the thermoplastic resin is used as the inner liner, this shear strain is likely to cause detachment at an adhesion interface between the inner liner and the carcass ply, with the result that air leakage takes place from the tire, disadvantageously.

Patent Literature 3 (International Publication WO2008/029781) discloses a technique for manufacturing a tire using a strip of film layer stack in which a thermoplastic resin and a thermoplastic elastomer are blended. Here, with the film layer stack, gas barrier property and adhesive property can be improved, whereby bonding can be achieved between the ribbon-shaped strips. However, with this technique, the strip may be unlikely to be adhered to the outer circumferential surface of the core body, particularly, the side surface from the bead portion to the buttress portion, and may peel off the core body, so that molding would not be performed.

Patent Literature 4 (Japanese Patent Laying-Open No. 2000-254980) discloses sequentially winding a ribbon-shaped unvulcanized rubber strip on a cylindrical drum, thereby forming a rubber component having a contour shape close to a desired finished sectional shape.

Conventionally, an inner liner used for a pneumatic tire is obtained in general by continuously extrusion molding into a predetermined finished sectional shape from a rubber extruder or the like. The finished sectional shape is determined by a mouthpiece provided at a head part of the rubber extruder. In the conventional method for extrusion molding into a finished sectional shape, the sectional size of a rubber component is large, so that a large size rubber extruder needs to be used. As a result, a production line cannot be reduced in size. Moreover, to solve problems of deteriorated productivity in small quantity, large variety production and the like, various types of mouthpieces should be prepared depending on the types of tire and the like, and besides, exchanging and adjusting operations of the mouthpiece and the like are required every time the type of tire to be manufactured is changed.

However, when forming a tire component by a ribbon-shaped rubber strip, workability is disadvantageous due to tackiness between rubber compositions and the rubber component formed of the rubber strip deforms disadvantageously during storage.

Patent Literature 5 (Japanese Patent Laying-Open No. 9-19987) discloses a layer stack for improving adhesive property between an inner liner layer and a rubber layer. By providing adhesion layers on the opposite sides of the inner liner layer, the adhesion layers come into contact with each other at an overlapping portion of the inner liner layer and are bonded firmly by heating. Air pressure retainability is thus improved. However, these adhesion layers for overlapping in the inner liner layer will come into contact with a bladder in a heated state in a vulcanization step and will be stuck to the bladder disadvantageously.

CITATION LIST

Patent Literature

PTL 1: Japanese Patent Laying-Open No. 7-215007
PTL 2: Japanese Patent Laying-Open No. 11-254906
PTL 3: International Publication WO2008/029781
PTL 4: Japanese Patent Laying-Open No. 2000-254980
PTL 5: Japanese Patent Laying-Open No. 9-19987

SUMMARY OF INVENTION

Technical Problem

The present invention provides a ribbon-shaped strip used for an inner liner and a method for manufacturing the strip. A conventional strip has a flat rectangular cross sectional shape. Therefore, when winding the ribbon-shaped strip of predetermined width to produce a wider sheet, overlapping portions on the opposite ends of the strip are made thicker. A first purpose of the present invention is to reduce unevenness of the thickness of an inner liner by providing ear portions for a ribbon-shaped strip.

Moreover, the present invention reduces rolling resistance of a tire by achieving weight reduction through the use of a strip of one or more layers of a thermoplastic elastomer. In addition, since a tackifier is blended, the inner liner can be molded while holding the strip in a region where a curve is tight on a side surface of the core body. As a result, the inner liner can be prevented from breaking and deforming by heat and pressure of a bladder in a vulcanization step, thereby avoiding cracks in the surface and/or air remaining inside.

Furthermore, the present invention improves uniformity of the tire by molding the inner liner with the strip of a thermoplastic elastomer wound on the outer circumferential surface of the core body, the inner liner thus resembling the inner surface shape of a vulcanized tire. The present invention also has an object to improve adhesive property between the inner liner and the carcass ply, thereby reducing crack growth following repeated flection deformation during traveling with the tire.

Solution to Problem

The present invention is a strip to be wound on an outer circumferential surface of a core body in a circumferential direction to form an inner liner having a shape close to a finished sectional shape of a tire. The strip is formed of one of a single layer including a first layer arranged in a tire innermost layer and composite layers of the first layer and a second layer disposed adjacently to a carcass ply and made of a thermoplastic elastomer composition. The first layer is a thermoplastic elastomer composition containing a styrene-isobutylene-styrene block copolymer and at least one kind of a tackifier, a butyl-based rubber and a natural rubber. The strip has a strip main body having a thickness T1 of 0.02 to 1.0 mm and ear portions formed on opposite sides of the strip main body. The ear portions have a thickness T2 smaller than thickness T1 and a width W2 of 0.5 mm to 5.0 mm.

Preferably, the strip is formed of a layer stack of the first layer and the second layer disposed adjacently to the carcass ply, wherein the second layer contains one of a styrene-isoprene-styrene block copolymer and a styrene-isobutylene block copolymer. The strip preferably has a width (W0) ranging from 5 mm to 60 mm.

Another aspect of the present invention is a method for manufacturing the strip made of a thermoplastic elastomer, including the steps of (a) extruding a thermoplastic elastomer by an extruder having an extruder main body and an extrusion head to form a sheet having a horizontally-long rectangular cross section, (b) passing the sheet through a die roller and a nip roller to transfer a shape of the die roller on the sheet to form the strip having the ear portions on ends of the strip, and (c) detaching the strip from the die roller.

A still another aspect of the present invention is a method for manufacturing a pneumatic tire, in which a strip is wound of an outer circumferential surface of the core body along a circumferential direction with its side edge offset to mold an inner liner having a shape close to a finished sectional shape or a tire, wherein (a) the strip is formed of one of a single layer including a first layer arranged in a tire innermost layer and made of a thermoplastic elastomer composition containing a styrene-isobutylene-styrene block copolymer and composite layers of the first layer and a second layer disposed adjacently to a carcass ply and made of a thermoplastic elastomer composition, and (b) the strip has a strip main body having a thickness T1 of 0.02 to 1.0 mm and ear portions formed on opposite sides of the strip main body, the ear portions having a thickness T2 smaller than thickness T1 and a width W2 of 0.5 mm to 5.0 mm.

The core body preferably has an outer circumferential surface resembling a tire inner surface shape when 5% of internal pressure is applied to the tire. The core body preferably has an outer circumferential surface smaller than a tire inner surface shape when 5% of internal pressure is applied to the tire.

An aspect of the present invention includes the step of molding the inner liner on the outer circumferential surface of the core body using the strip, and then assembling with another tire component to mold an unvulcanized tire, and the step of vulcanizing of removing the unvulcanized tire from the core body and inputting the unvulcanized tire into a vulcanization mold for vulcanization molding.

In the step of vulcanizing, the unvulcanized tire is preferably vulcanized with 0.1% to 2.0% of a radius stretch by expansion of a bladder disposed on an inner side of the unvulcanized tire. In the step of vulcanizing, the unvulcanized tire is preferably vulcanized with 0.1% to 2.0% of a stretch in a radial direction by expansion of a bladder disposed on an inner side of the unvulcanized tire.

Another aspect of the present invention is a method for manufacturing a pneumatic tire, including the steps of molding an unvulcanized tire molded using the strip on the outside of the core body, and inputting the unvulcanized tire and the core body together into a vulcanization mold and heating the vulcanization mold and the core body, thereby vulcanizing the tire.

Advantageous Effects of Invention

According to the present invention, a ribbon-shaped strip of a thermoplastic elastomer composition having ear portions on the opposite ends thereof is wound on the outer circumferential surface of a core body of a tire to mold an inner liner, whereby uniformity of the tire and adhesive property with an adjacent carcass ply can be increased and flection crack growth can be reduced.

An unvulcanized raw cover adjusted in thickness depending on the arrangement position of the inner liner can thus be designed. For example, merely a buttress portion can be designed to be thick, which can improve gas barrier property and tire durability. Moreover, because the strip is of ribbon shape, it is applicable to tires of any tire size. Particularly because of the use of a plurality of layers of thermoplastic elastomers, the overall thickness can be made thin to achieve weight reduction while maintaining air shutoff property, so that rolling resistance can be reduced.

DESCRIPTION OF EMBODIMENTS

<Structure of Tire>

The present invention relates to a method for manufacturing a pneumatic tire including an inner liner disposed inwardly in the tire. The inner liner is manufactured by spirally winding a ribbon-shaped strip on an outer circumferential surface of a core body of the tire. The ribbon-shaped strip has ear portions on the opposite ends thereof. Here, the ribbon-shaped strip is manufactured by extrusion molding into a state close to a finished sectional shape.

The strip is formed of a polymer layer stack of a single layer at least having a first layer or at least two layers. The first layer contains a styrene-isobutylene-styrene triblock copolymer (SIBS), and has a thickness ranging from 0.05 mm to 0.6 mm. The second layer contains at least one of a styrene-isoprene-styrene triblock copolymer (SIS) and a styrene-isobutylene diblock copolymer (SIB), and has a thickness of 0.01 mm to 0.3 mm. The second layer is arranged to be in contact with a rubber layer of a carcass ply.

Figure 1:
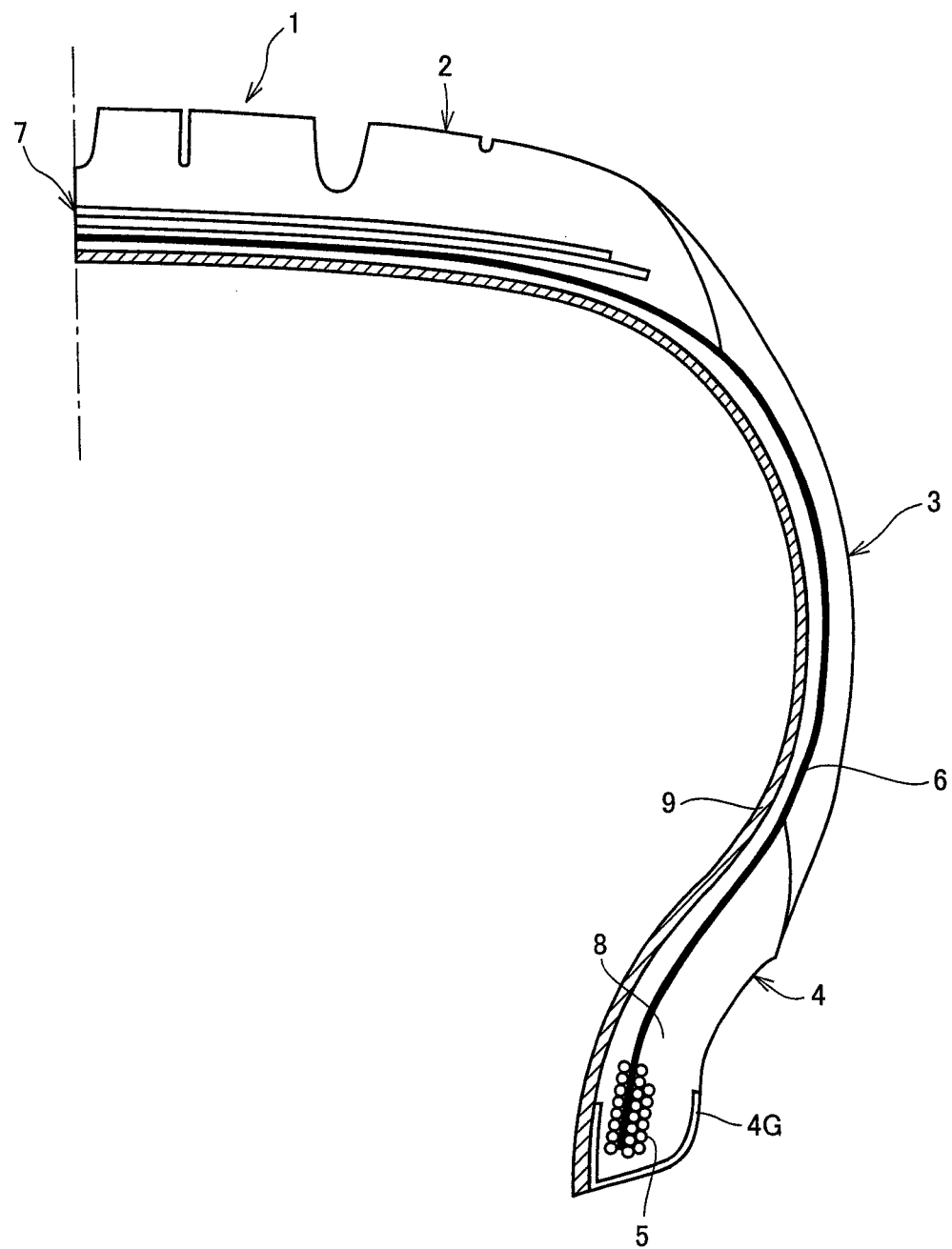
FIG. 1 is a schematic cross sectional view of the right half of a pneumatic tire of the present invention.

A pneumatic tire manufactured by the present invention will be described based on the drawings. FIG. 1 is a schematic cross sectional view of the right half of the pneumatic tire. In the figure, pneumatic tire 1 includes a tread portion 2, and a sidewall portion 3 and bead portions 4 so as to form a shape of toroid from the opposite ends of the tread portion. In each of bead portions 4, a bead core 5 is embedded. Further, a carcass ply 6 and a belt layer 7 are disposed. Carcass ply 6 is provided to extend from one bead portion 4 to the other bead portion, and has its ends anchored to bead cores 5. Belt layer 7, which is formed of at least two plies, is disposed outside a crown portion of carcass ply 6.

Belt layer 7 is disposed such that two plies, which are formed of cords such as steel cords or aramid fibers, are arranged to allow the cords to cross each other between the plies normally at an angle of 5° to 30° relative to the tire circumferential direction. It should be noted that topping rubber layers can be provided on the outer sides of the ends of the belt layer to reduce detachment in the ends of the belt layer. Further, in the carcass ply, organic fiber cords such as polyester, nylon, or aramid are arranged at substantially 90° relative to the tire circumferential direction. On each of the opposite ends of the carcass ply and in the vicinity of bead core 5, a bead apex 8 is disposed to extend in the sidewall direction. Further, an inner liner 9 is disposed inwardly relative to carcass ply 6 in the direction of the tire radius, so as to extend from one bead portion 4 to the other bead portion 4.

<Shape of Strip>

Figure 4:
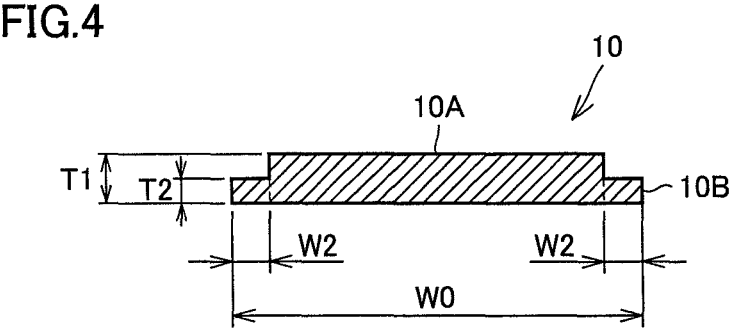
FIG. 4 is a schematic cross sectional view of a strip of the present invention.
Figure 5:
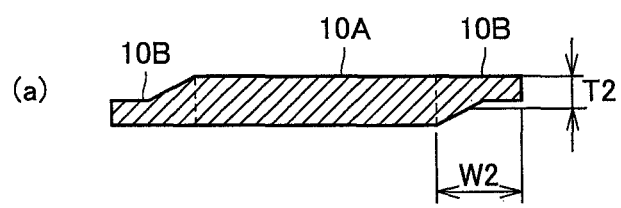
FIG. 5 is a schematic cross sectional view of strips of the present invention.
Figure 5:
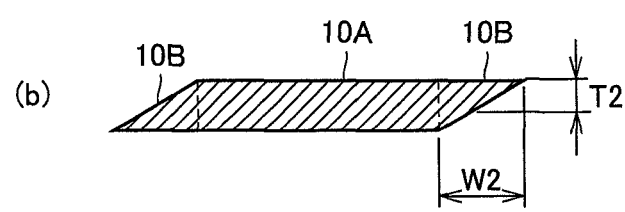
Figure 6:
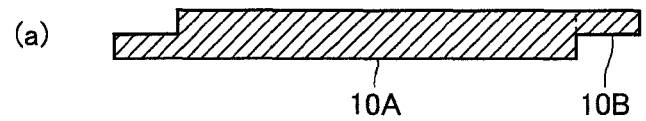
FIG. 6 is a schematic cross sectional view of strips of the present invention.
Figure 6:
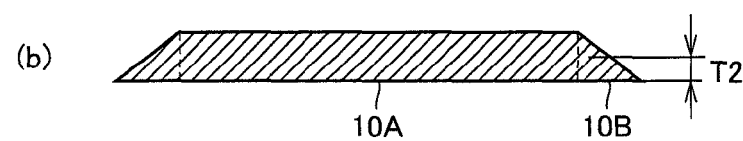

Each of FIGS. 4 to 6 shows a cross sectional view of an embodiment of a strip 10. Strip 10 is configured such that a strip main body 10A has a thickness (T1) of 0.05 mm to 1.0 mm and ear portions 10B formed on the opposite sides of strip main body 10A have a thickness (T2) thinner than the thickness (T1) of the strip main body. Ear portions 10B preferably have a width (W2) of 0.5 mm to 5.0 mm so as to smooth out unevenness that would be formed on the surface wound on a drum. The strip has an overall width (W0) adjusted to range from 5 mm to 40 mm, and preferably ranges from 10 to 30 mm.

In the present invention, the thickness (T1) of strip main body 10A needs to be in a range of 0.05 mm to 1.0 mm. If the thickness is less than 0.05 mm, extrusion molding will be difficult, and the number of times will be increased unnecessarily in order to form an inner liner of predetermined thickness. On the other hand, if the thickness exceeds 1.0 mm, a thick part will be formed at junctions on the opposite edges of the strip. Accuracy in contour shape will be deteriorated, flection durability of the inner liner will be decreased and weight reduction can no longer be expected. The thickness (T1) of the strip preferably ranges from 0.1 mm to 0.5 mm.

The thickness (T2) of ear portions 10B, made thinner than the thickness (T1) of the strip main body, ranges from 0.02 mm to 0.5 mm, and more preferably ranges from 0.05 mm to 0.2 mm. If the thickness (T2) of the ear portions is thinner than 0.02 mm, extrusion dimensional accuracy may be deteriorated. On the other hand, if the thickness (T2) of the ear portions is thicker than 0.5 mm, unevenness of the surface formed by adjacent portions of the strip may be increased. Here, the thickness (T2) of the ear portions is defined as an average thickness in the widthwise direction when it is changed in thickness in the widthwise direction of the strip.

Next, the strip has a width (W0) ranging from 5 mm to 40 mm, preferably ranging from 10 to 30 mm. By setting the width (W0) of the strip at this range, accuracy in contour shape of the inner liner can be increased.

Ear portions 10B have a width (W2) adjusted to be in a range of 0.5 mm to 5.0 mm, preferably in a range of 0.8 mm to 3.0 mm so as to be wound on a drum and smooth out unevenness formed on the surface. If the width (W2) of the ear portions falls outside the range of 0.5 mm to 5.0 mm, the thickness dimension of the cross section of the inner liner formed by bonding the strip may become uneven. It should be noted that the value of (W2×2) is preferably not more than the value of (W0×0.5).

Here, although ear portions 10B of the strip are preferably symmetric on the right and left ends of the strip main body, they can be asymmetric. For example, in FIG. 4, the ear portion on the left end is formed with a constant thickness on the lower surface, and the ear portions on the opposite ends are formed with a constant thickness on the lower surface. With such a shape, the ear portions of the strip adjacent to each other when winding the strip on the drum to form the inner liner reduce a step difference formed at the strip ends, enabling less uneven bonding. It should be noted that strip main body 10A has its thickness (T1) forming a horizontally long, flat rectangular shape constant in the longitudinal direction.

FIG. 5(a) shows a structure in which ear portions 10B of the strip partially have inclined sections. FIG. 5(b) shows an example in which ear portions 10B of the strip are formed only by inclined sections. It should be noted that, with the strip of the present invention, the ear portions of the strip adjacent to each other when winding the strip on the drum to form the inner liner can reduce a step difference at the strip ends. It should be noted that symmetrical or asymmetrical shape can be employed for the ear portions.

FIG. 6(a) shows ear portions 10b formed by forming steps on the right and left ends of strip main body 10A, ear portions 10b being made thinner. Ear portions 10b are asymmetric on the opposite sides of the strip. FIG. 6(b) shows ear portions 10b gradually decreasing in thickness toward the lower surface of the strip at the right and left ends of strip main body 10A. In this case, when bonding the strip on the drum, a step difference will also be formed at ends of adjacent portions of the strip, but an inner liner sheet having a less uneven surface shape can be obtained.

By forming the strip of the present invention into the above-described shape, adjacent ear portions of the strip fit together appropriately when winding the strip on the drum to form an inner liner, so that a junction of even thickness can be formed. Not only these shapes but also various variations can be employed for the ear portions of the present invention. It should be noted that the thickness (T1) of strip main body 10A forms a horizontally long, flat rectangular shape substantially constant in the longitudinal direction.

<Method for Manufacturing Strip>

A method for manufacturing strip 10 will be described with reference to FIG. 2. A strip manufacturing device 11 is composed of an extruder 13 for extrusion molding of a thermoplastic elastomer sheet 12 having a horizontally-long rectangular cross section and a nip roller 14A and a die roller 14B arranged in the vicinity of an extrusion port 16.

Extruder 13 includes an extruder main body 13A having a screw shaft 15 and an extrusion head 13B forming a sheet of a thermoplastic elastomer discharged from this extruder main body 13A to extrude the sheet through extrusion port 16. Extruder main body 13A kneads and melts the input thermoplastic elastomer with screw shaft 15 driven by a motor having a slowdown function. Extrusion head 13B has a mouthpiece 17 for extrusion molding attached to the leading end of extruder main body 13A to constitute extrusion port 16.

Nip roller 14A and die roller 14B constitute a pair of upper and lower rollers, and are held in the transverse direction orthogonal to the direction of extrusion through extrusion port 16. Nip roller 14A and die roller 14B are rotatably drive controlled at the same speed and in synchronization with each other.

Figure 3:
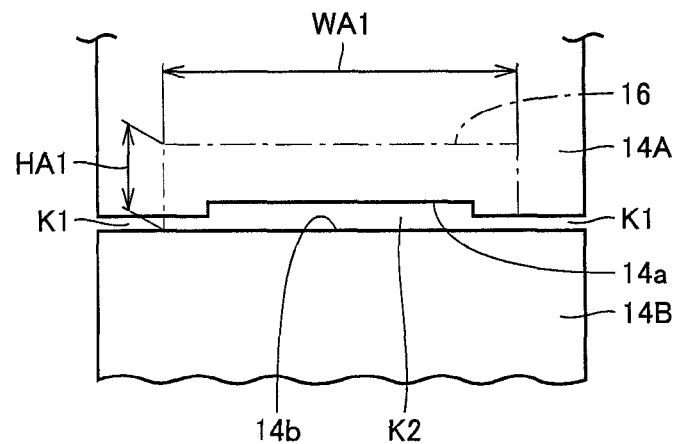
FIG. 3 is a cross sectional view showing the distance between a nip roller and a die roller in the manufacturing device shown in FIG. 2.

In addition, a gap between nip roller 14A and die roller 14B presents a shape resembling the sectional shape of strip 10 (FIG. 4), as shown in FIG. 3. Here, "resembling" refers to being substantially similar to the sectional shape of strip 10. The similarity proportion is usually in a range of 0.50 to 0.90 in consideration of expansion, and a gap K2 is smaller.

That is, die roller 14B is provided with recessed sections 14a, 14b on the circumferential surface of a straight cylindrical roll body. Recessed sections 14a, 14b correspond to strip main body 10A (FIG. 4). Therefore, ear portions 10B are molded by gaps K1 between nip roller 14A and die roller 14B, and strip main body 10A of FIG. 4 is molded by gap K2 formed by recessed sections 14a, 14b.

Figure 2:
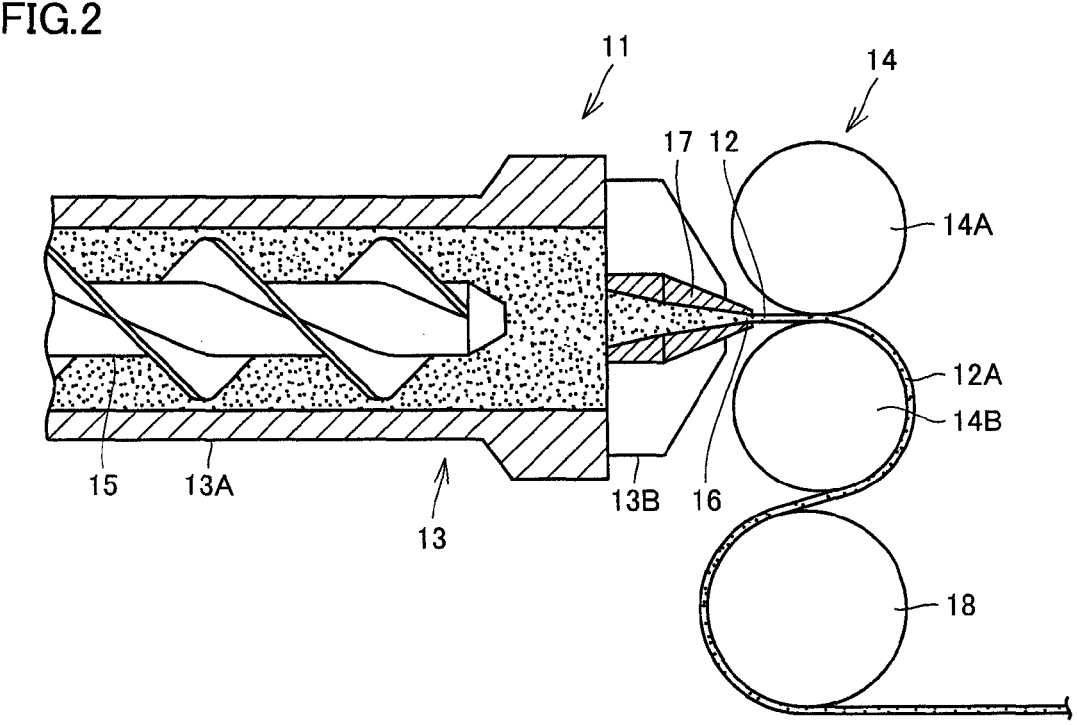
FIG. 2 is a schematic view of a device manufacturing a strip of the present invention.

In FIG. 2, in manufacturing device 11, horizontally-long rectangular sheet 12 is formed first by extruder 13, and the shape of the die roller is transferred to the sheet on the condition that heat is not generated during die roll molding. Then, strip 12A with the ear portions is detached from die roller 14B by a free roller 18, and is processed into a final shape. Accordingly, dimensional accuracy and stability are increased, and manufacturing efficiency can be improved in that, for example, a knife cutting operation for width adjustment usually required in calender molding becomes unnecessary. Besides, variations in the thickness (T2) of ear portions 10B can be reduced, so that strip 10 of high quality can be manufactured.

It should be noted that it is preferable to set an opening height (HA1) of extrusion port 16 of extrusion head 13B at 2 to 7 times thickness T1 of the strip and to set an opening width (WA1) of extrusion port 16 at 0.7 to 1.0 times the width (W0) of the strip.

If the opening height (HA1) exceeds 7 times T1 and the opening width (WA1) is less than 0.7 times W0, the processing ratio in die roll molding will be excessively large, resulting in degraded quality and accuracy of strip 10. Particularly, accuracy in width will become unstable, which will require knife cutting to maintain width accuracy. If the opening height (HA1) is less than twice T1, the sheet thickness at the time of extrusion will be thin in order to obtain strip 12A of not more than 1.0 mm. Then, extrusion pressure will be higher, resulting in unstable dimensions. On the other hand, if the opening width (WA1) exceeds W0, the processing ratio will become too small to the contrary to cause strip 12A to break, and dimensional stability will be deteriorated.

It should be noted that it is desirable to perform mold release processing on the die roller, the nip roller and the free roller to be used in the molding step and the detaching step. Examples of a conventional technique that can be adopted for the mold release processing include a method for subjecting the roller surface to nitriding (radical nitriding, Kanuc process) to obtain a Cr—N coating (hardness Hv: 200 to 800; thickness: 25 to 500 μm), plating obtained by impregnating hard chromium with Teflon® (hardness Hv: 800 to 1000; thickness: 25 to 1000 μm), a diamond-like carbon (DLC) coating (hardness Hv: 2000 to 7000; thickness: 0.2 to 3.0 μm), and a Teflon® coating (hardness Hv: 100 to 500; thickness: 0.1 to 0.5 μm).

<Thermoplastic Elastomer Composition Constituting Strip>

The strip of the present invention is implemented by a single layer of a thermoplastic elastomer composition or a polymer layer stack of a plurality of thermoplastic elastomers. Here, the thermoplastic elastomer composition is a thermoplastic elastomer composition (hereinafter also referred to as a "first layer") containing a styrene-isobutylene-styrene block copolymer and at least one kind of a tackifier, a butyl-based rubber and a natural rubber.

The strip of the present invention can be formed of a single layer of the first layer, but may be formed of a polymer layer stack of a plurality of layers including the first layer and a second layer of a thermoplastic elastomer composition disposed adjacently to the carcass ply. The compositions of the first layer and the second layer will be described below.

By forming the strip with the ear portions by this polymer layer stack to manufacture an inner liner, surface unevenness can be reduced and made smooth. This can solve the conventional problems, such as remaining air due to great unevenness.

<First Layer>
[SIBS]

The elastomer composition of the first layer contains a styrene-isobutylene-styrene triblock copolymer (SIBS) by 5 mass % to 100 mass % as a polymer component. If the SIBS is less than 5 mass %, air shutoff property may be deteriorated. From a viewpoint of ensuring air shutoff property, the blending quantity of the SIBS in the first layer is preferably in a range of 10 mass % to 80 mass %.

An isobutylene block in the SIBS provides a polymer film made of the SIBS with excellent air permeability resistance. Therefore, when the polymer made of the SIBS is used for the inner liner, a pneumatic tire excellent in air permeability resistance can be obtained.

Further, the molecular structure of the SIBS is completely saturated except aromatic side chain, so that the SIBS is restrained from being deteriorated and hardened and therefore has excellent durability. Therefore, when a polymer film made of the SIBS is used for the inner liner, a pneumatic tire with excellent durability can be obtained.

When manufacturing a pneumatic tire by applying such a polymer film made of the SIBS to the inner liner, air permeability resistance can be secured. Therefore, it is not necessary to use a halogenated rubber, such as a halogenated butyl rubber, having been conventionally used to provide air permeability resistance and having a high specific gravity. Even if it is used, an amount of usage thereof can be reduced. Accordingly, weight reduction of tire can be achieved, thus achieving the effect of improving fuel efficiency.

The molecular weight of the SIBS is not particularly limited, but the SIBS preferably has a weight average molecular weight of 50,000 to 400,000 measured through GPC measurement, in view of flowability, shaping step, rubber elasticity, and the like. When the weight average molecular weight thereof is less than 50,000, tensile strength and tensile elongation may be unfavorably decreased. On the other hand, when the weight average molecular weight thereof exceeds 400,000, extrusion workability unfavorably becomes bad. In order to further improve air permeability resistance and durability, the SIBS preferably contains the styrene component at a content of 10 mass % to 30 mass %, preferably, 14 mass % to 23 mass %.

In the copolymer of the SIBS, the isobutylene block preferably has a degree of polymerization in a range of approximately 10,000 to 150,000, and the styrene block preferably has a degree of polymerization in a range of approximately 5,000 to 30,000, in view of rubber elasticity and handling (when the degree of polymerization is less than 10,000, each block will be in a liquid form). The SIBS can be obtained through a general living cationic polymerization method for a vinyl-based compound. For example, each of Japanese Patent Laying-Open No. 62-48704 and Japanese Patent Laying-Open No. 64-62308 discloses that living cationic polymerization is possible between isobutylene and another vinyl compound and use of isobutylene and another compound for a vinyl compound allows for production of a polyisobutylene-based block copolymer.

The first layer made of such an SIBS has a thickness t1 of 0.05 mm to 0.6 mm. If the thickness of the first layer is less than 0.05 mm, the first layer may be broken due to pressing pressure when vulcanizing the raw tire in which the polymer layer stack is applied to the inner liner, with the result that an air leakage phenomenon may take place in the resulting tire. On the other hand, if the thickness of the first layer exceeds 0.6 mm, the weight of the tire is increased to result in decreased performance in fuel efficiency. Further, the first layer preferably has a thickness of 0.05 mm to 0.4 mm. The first layer can be formed by forming the SIBS into the form of a film by means of a general method for forming thermoplastic resin or thermoplastic elastomer into a film, such as extrusion molding or calender molding.

[Tackifier]

The elastomer composition of the first layer preferably contains a tackifier in a range of 0.1 part by mass to 100 parts by mass in the polymer component. If the tackifier is less than 0.1 part by mass, adhesion property with an adjacent tire component may be degraded. On the other hand, if the tackifier exceeds 100 parts by mass, tackiness will be too high, with the result that productivity is decreased and the gas barrier property is further decreased. The tackifier is preferably in a range of 1 part by mass to 50 parts by mass. Here, the "tackifier" refers to a compounding agent for increasing tackiness of the elastomer composition. Examples of such a tackifier will be illustrated below.

Typical tackifiers include a C9 petroleum resin and a C5 petroleum resin. Here, a C9 petroleum resin is an aromatic petroleum resin obtained by polymerizing C5 to C9 fractions (mainly C9 fraction) in a mixed state. The C5 to C9 fractions are remnants when obtaining useful compounds, such as ethylene, propylene, and butadiene, by thermally decomposing naphtha.

Examples thereof include products such as: ARKON P70, P90, P100, P125, P140, M90, M100, M115, and M135 (each provided by Arakawa Chemical Industries, Ltd, and having a softening point of 70° C. to 145° C.); I-MARV S100, S110, P100, P125, and P140 (aromatic copolymer-based hydrogenated petroleum resins each provided by Idemitsu Petrochemical Ltd, having a softening point of 100° C. to 140° C., having a weight average molecular weight of 700 to 900, and having a bromine number of 2.0 g/100 g to 6.0 g/100 g); and Petcoal XL (provided by TOSOH Corporation).

A C5 petroleum resin is an aliphatic petroleum resin obtained by polymerizing C4 to C5 fractions (mainly C5 fraction) in a mixed state. The C4 to C5 fractions are remnants when obtaining useful compounds, such as ethylene, propylene, and butadiene, by thermally decomposing naphtha. Examples thereof include products such as: Hilets G100 (provided by Mitsui Petrochemicals Industries, Ltd, and having a softening point of 100° C.); Marcalets T100AS (provided by Maruzen Petrochemical Co., Ltd, and having a softening point of 100° C.); and Escorez 1102 (provided by Tonex Co., Ltd, and having a softening point of 110° C.).

Examples of the terpene resin include products such as: YS resin PX800N, PX1000, PX1150, PX1250, and PXN1150N; and Clearon P85, P105, P115, P125, P135, P150, M105, M115, and K100 (each provided by Yasuhara Chemical Co., Ltd, and having a softening point of 75° C. to 160° C.).

Examples of the aromatic modified terpene resin include products such as: YS resin TO85, TO105, TO115, and TO125 (each provided by Yasuhara Chemical Co., Ltd, and having a softening point of 75° C. to 165° C.).

Examples of the terpene phenol resin include products such as: Tamanol 803L, and 901 (provided by Arakawa Chemical Industries Co., Ltd, and having a softening point of 120° C. to 160° C.); and YS Polyster U115, U130, T80, T100, T115, T145, and T160 (each provided by Yasuhara Chemical Co., Ltd, and having a softening point of 75° C. to 165° C.).

Examples of the cumarone resin include a cumarone resin having a softening point of 90° C. (provided by Kobe Oil Chemical Industrial Co., Ltd). Examples of the cumarone indene oil include products such as 15E (provided by Kobe Oil Chemical Industrial Co., Ltd, and having a fluidizing point of 15° C.).

Examples of the rosin ester include products such as: ester gum AAL, A, AAV, 105, AT, H, HP, and HD (each provided by Arakawa Chemical Industries Co., Ltd, and having a softening point of 68° C. to 110° C.); and Hariester TF, S, C, DS70L, DS90, and DS130 (each provided by Harima Chemicals Inc., and having a softening point of 68° C. to 138° C.).

Examples of the hydrogenated rosin ester include products such as Superester A75, A100, A115, and A125 (each provided by Arakawa Chemical Industries Co., Ltd., and having a softening point of 70° C. to 130° C.).

Examples of the alkylphenol resin include products such as Tamanol 510 (provided by Arakawa Chemical Industries Co., Ltd, and having a softening point of 75° C. to 95° C.). Examples of the DCPD include products such as Escorez 5300 (provided by Tonex Co., Ltd, and having a softening point of 105° C.).

For the tackifier, a fully hydrogenated petroleum resin of the C9 petroleum resins is well compatible with the SIB, and can improve adhesive property without decreasing the gas barrier property. Further, it has an effect of decreasing a degree of viscosity, and therefore can be used advantageously for film extrusion molding.

[Rubber Component]

The elastomer composition of the first layer can contain a butyl rubber or a natural rubber (including an isoprene rubber) in a range of 60 mass % to 95 mass % as a polymer component. If the butyl rubber or the natural rubber (including an isoprene rubber) is less than the 60 mass %, viscosity will be high and extrusion workability will be deteriorated. Weight reduction by thickness reduction may not be achieved. If the butyl rubber or the natural rubber exceeds 95 mass %, air shutoff property may be deteriorated. In order to increase unvulcanization adhesive property and vulcanization adhesive property of the elastomer composition, the butyl rubber or the natural rubber is preferably in a range of 70 mass % to 90 mass %.

<Second Layer>

The second layer used for the strip of the present invention preferably contains at least one of the SIS layer made of a styrene-isoprene-styrene triblock copolymer (hereinafter, also referred to as "SIS") and the SIB layer made of a styrene-isobutylene diblock copolymer (hereinafter, also referred to as "SIB").

The isoprene block of the styrene-isoprene-styrene triblock copolymer (SIS) is a soft segment. Hence, a polymer film made of the SIS is likely to adhere to a rubber component through vulcanization. Therefore, when a polymer film made of the SIS is used for the inner liner, a pneumatic tire excellent in durability can be obtained because the inner liner is excellent in adhesive property with the rubber layer of the carcass ply, for example.

The molecular weight of the SIS is not particularly limited, but the SIS preferably has a weight average molecular weight of 100,000 to 290,000 measured through GPC measurement, in view of rubber elasticity and moldability. When the weight average molecular weight thereof is less than 100,000, tensile strength may be unfavorably decreased. On the other hand, when the weight average molecular weight thereof exceeds 290,000, extrusion workability unfavorably becomes bad. The SIS preferably contains the styrene component at a content of 10 mass % to 30 mass % in view of tackiness, adhesive property, and rubber elasticity.

In the present invention, it is preferable that in the SIS, the isoprene block has a degree of polymerization in a range of approximately 500 to 5,000 and the styrene block has a degree of polymerization in a range of approximately 50 to 1,500 in view of rubber elasticity and handling.

The SIS can be obtained through a general polymerization method for a vinyl-based compound, such as the living cationic polymerization method. The SIS layer can be obtained by forming the SIS into the form of a film by means of a general method for forming thermoplastic resin or thermoplastic elastomer into a film, such as extrusion molding or calender molding.

The isobutylene block of the styrene-isobutylene diblock copolymer (SIB) is a soft segment. Hence, a polymer film made of the SIB is likely to adhere to a rubber component through vulcanization. Therefore, when a polymer film made of the SIB is used for the inner liner, a pneumatic tire excellent in durability can be obtained because the inner liner is excellent in adhesive property with an adjacent rubber forming the carcass or an insulation, for example.

For the SIB, a linear SIB is preferably used in view of rubber elasticity and adhesive property. The molecular weight of the SIB is not particularly limited, but the SIB preferably has a weight average molecular weight of 40,000 to 120,000 measured through GPC measurement, in view of rubber elasticity and moldability. When the weight average molecular weight thereof is less than 40,000, tensile strength may be unfavorably decreased. On the other hand, when the weight average molecular weight thereof exceeds 120,000, extrusion workability unfavorably becomes bad.

The SIB preferably contains the styrene component at a content of 10 mass % to 35 mass %, in view of tackiness, adhesive property, and rubber elasticity. In the present invention, it is preferable that in the SIB, the isobutylene block has a degree of polymerization in a range of approximately 300 to 3,000 and the styrene block has a degree of polymerization in a range of approximately 10 to 1,500 in view of rubber elasticity and handling.

The SIB can be obtained through a general polymerization method for a vinyl-based compound, such as the living cationic polymerization method. For example, WO2005/033035 discloses a manufacturing method wherein the SIB is obtained by adding methylcyclohexane, n-butyl chloride, and cumyl chloride into an agitator, cooling them to −70° C., reacting them for 2 hours, then adding a large amount of methanol to stop the reaction, and performing vacuum-drying at 60° C.

The SIB layer can be obtained by forming the SIB into the form of a film through a general method for forming thermoplastic resin or thermoplastic elastomer into a film, such as extrusion molding or calender molding.

The thickness of the second layer ranges from 0.01 mm to 0.3 mm. Here, the thickness of the second layer refers to the thickness of the SIS layer if the second layer is composed only of the SIS layer, refers to the thickness of the SIB layer if the second layer is composed only of the SIB layer, and refers to the total thickness of the SIS layer and the SIB layer if the second layer is composed of two layers of the SIS layer and the SIB layer. If the thickness of the second layer is less than 0.01 mm, the second layer may be broken due to pressing pressure when vulcanizing the raw tire in which the polymer layer stack is applied to the inner liner, with the result that vulcanization adhesion strength may be decreased. On the other hand, if the thickness of the second layer exceeds 0.3 mm, the weight of the tire is increased to result in decreased performance in fuel efficiency. Further, the second layer preferably has a thickness of 0.05 mm to 0.2 mm.

<Method for Manufacturing Tire>

A method for manufacturing a pneumatic tire will now be described. The method for manufacturing the pneumatic tire of the present invention includes a method for molding an inner liner, a step of molding a raw cover and a step of vulcanizing the raw cover. These steps will now be described.

<Molding of Inner Liner>

Figure 7:
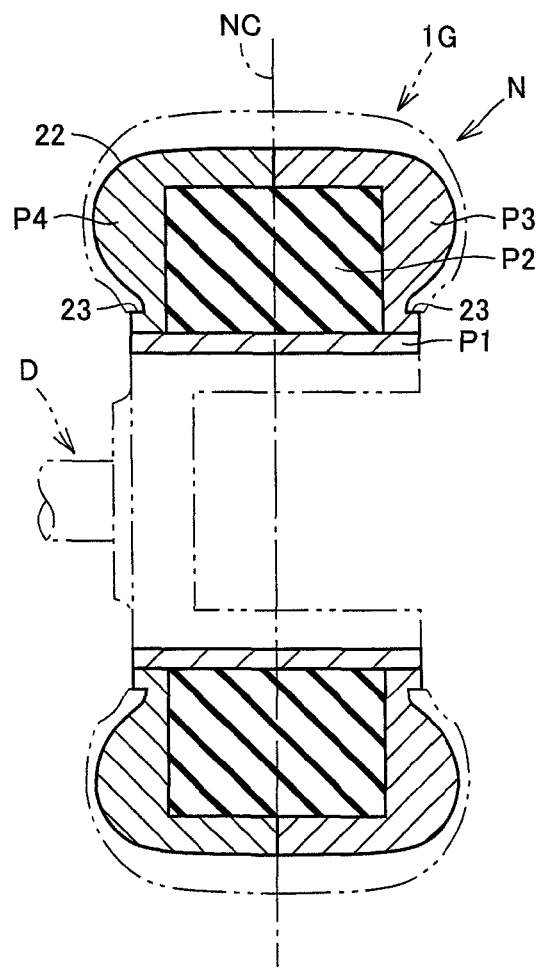
FIG. 7 is a cross sectional view of a core body used for molding of the tire of the present invention.
Figure 8:
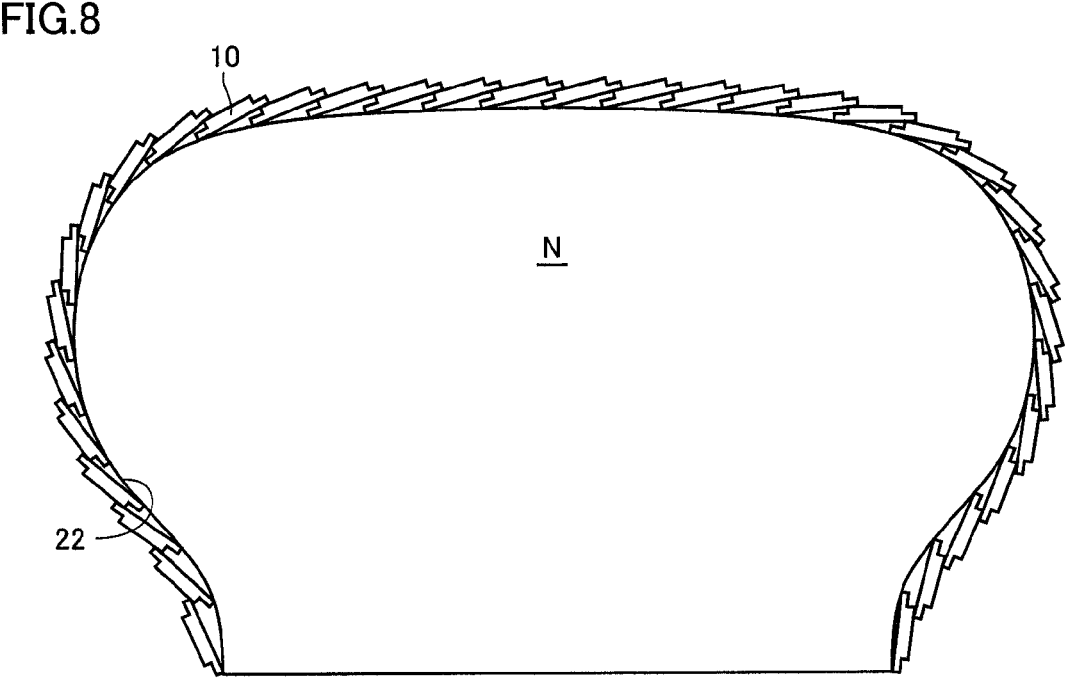
FIG. 8 is a schematic view showing a method of molding an inner liner using a strip on the outer circumferential surface of the core body.

Molding of the inner liner is performed in accordance with a schematic view shown in FIG. 8 using core body N shown in FIG. 7. In FIGS. 7 and 8, the inner liner is formed by winding strip 10 on an outer circumferential surface 22 of core body N with its side edge offset in the circumferential direction. Here, strip 10 is of a ribbon shape having width W0 of about 5 mm to 60 mm and thickness T1 of about 0.5 mm to 1.0 mm, for example. When winding, one end of strip 10 is affixed to outer circumferential surface 22 of core body N, and then core body N is rotated around a support shaft D and strip 10 is moved with a predetermined pitch in the direction of rotation axis. Thereby, an inner liner 9G formed of strip 10 can be disposed in a partial or an entire area of outer circumferential surface 22 of core body N, as shown in FIG. 8. This method for molding a strip is called a strip winding method, which can be employed for forming a complicated three-dimensional shape. It should be noted that, for molding of the inner liner, a wide strip may be wound in a tread region, and the strip winding method may be adopted for the side portions on the opposite sides thereof.

Figure 9:
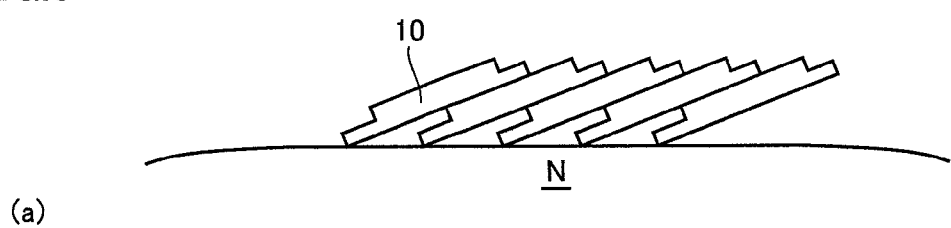
FIG. 9 is an enlarged cross sectional view showing an arrangement of the strip of FIG. 8.
Figure 9:
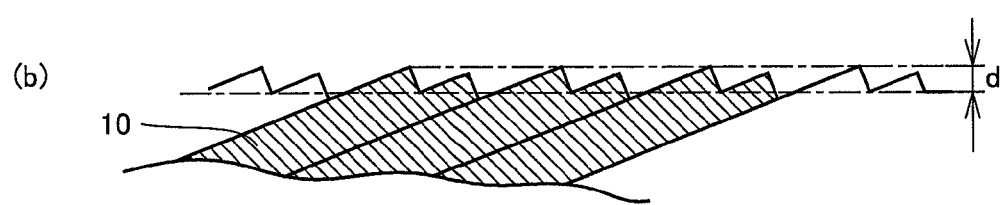
Figure 11:
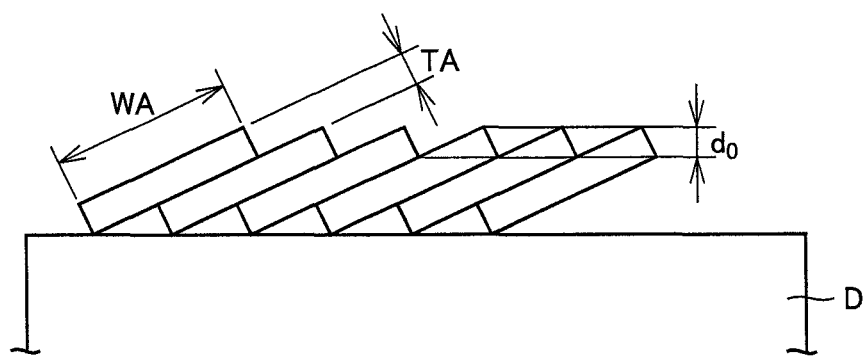
FIG. 11 is a schematic view showing a method for manufacturing an inner liner using a conventional strip.

When winding strip 10, adjacent portions of the strip form a step difference as shown in FIGS. 9(a) and 9(b) with their ends shown on an enlarged scale, but the ear portions will reduce an uneven step difference (d). On the other hand, as shown in FIG. 11, an uneven step difference (d0) formed in the case of using a conventional strip of rectangular cross section having no ear portions is about twice the unevenness in the case of the strip having the ear portions.

In this way, the use of the strip having the ear portions facilitates making the inner liner resemble a finished sectional shape required of the inner liner. In addition, a smooth contour can be obtained, and surface cracks can be prevented from occurring after vulcanization. On the other hand, the inner liner can be formed by approximately the same number of times of winding as in the case of a conventional strip of the same thickness, which can restrain production efficiency from being deteriorated and air from remaining.

In the present invention, although the width of overlapping portions at the time of winding the strip is adjusted depending on the finish thickness of a tire component to be formed, inner surface smoothness and sectional shape, it is typically adjusted to be in a range of 1 mm to 40 mm. If the width of the overlapping portions deviates from the range of 1 mm to 40 mm, accuracy in contour shape of the inner liner may be deteriorated.

Figure 10:
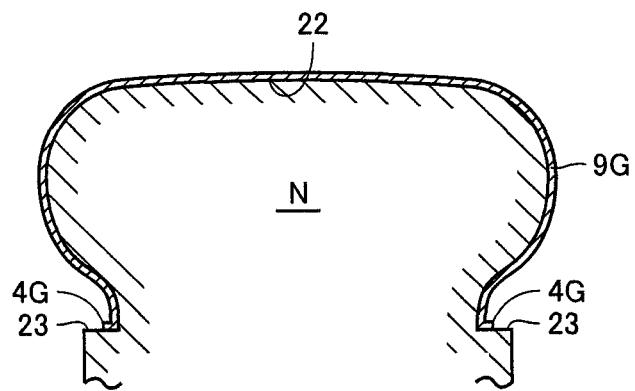
FIG. 10 is a schematic view of the inner liner molded on the outer circumferential surface of the core body.
Figure 12:
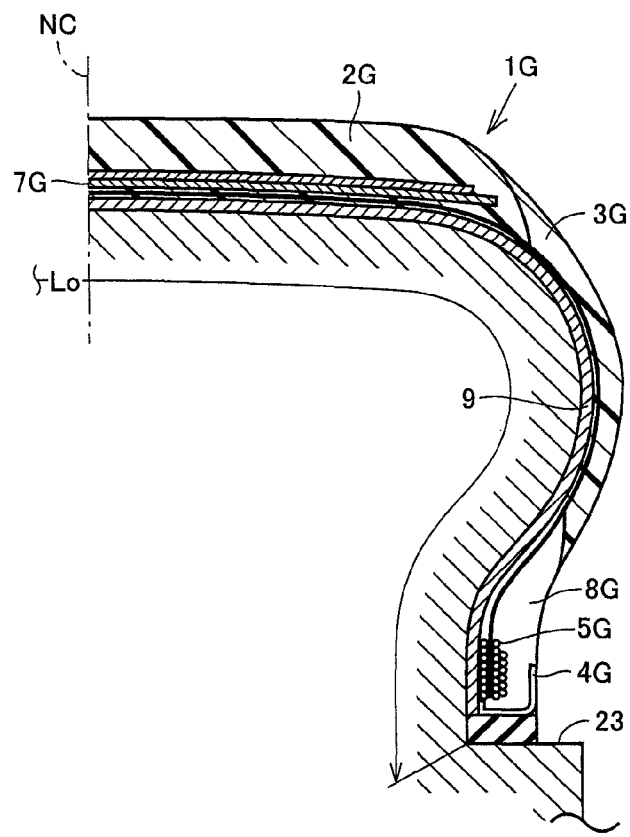
FIG. 12 is a cross sectional view of a molded unvulcanized tire.

It should be noted that, in the step of molding a raw cover 1G of FIG. 12 including molding of the inner liner, inner liner 9 is affixed to the outside of core body N, and the base of a clinch rubber 4G represents a rectangular cross sectional shape, for example, and is wound on a flange surface 23 into a ring shape, as shown in FIG. 10.

Core body N has three-dimensional outer circumferential surface 22 resembling the tire inner surface shape when 5% of internal pressure is applied to a product tire, and pair of flange surfaces 23 connected to the bead-side ends of this outer circumferential surface and extending outwardly in the axial direction. Here, the tire inner surface shape refers to the inner surface shape of a product tire. Moreover, "when 5% of internal pressure is applied to a product tire" shall refer to a state where pressure has been reduced from the normal internal pressure of the tire to 5% of the normal internal pressure. Generally, the sectional shape of a tire in this 5% internal pressure applied state is similar to the sectional shape of the tire in a vulcanization mold. Therefore, by making outer circumferential surface 22 of core body N resemble the inner surface shape of the tire when 5% of internal pressure is applied, strain which is elongation of a raw cover during vulcanization molding can be reduced, and tire uniformity can be improved.

FIG. 7 illustrates an assembly type core body N formed of a plurality of split pieces P1 to P4 that can be divided in the tire circumferential direction. Therefore, after forming raw cover 1G on the outside of core body N, respective split pieces P1 to P4 can be decomposed and taken out from raw cover 1G in a predetermined order. Core body N is not limited to the assembly type as in the present embodiment, but various types having rigidity such that its outer circumferential surface 22 is not substantially deformed during raw cover molding, such as an expansion type through the use of hydrostatic pressure, a contraction type, a drum type that can increase and decrease in diameter in the direction of the tire radius, can be adopted. Core body N of the present embodiment is supported by support shaft D in a cantilever and rotatable manner. It should be noted that, in such a case where assembly type core body N is vulcanized together with the raw cover, a metallic material, such as duralumin, for example, that can resist heat and pressure during the vulcanization is suitable. In such a case where core body N is taken out from the raw cover for vulcanization, a resin material excellent in handling or the like is suitable for core body N.

<Molding of Unvulcanized Tire>

Next, the step of forming a bead core on the outside of inner liner 9G in the bead region in FIG. 10 is performed. The bead core is formed by spirally winding a bead wire supplied continuously, for example, by several turns so as to be stacked from the base of the clinch rubber in the direction of the tire radius. Spiral winding of the bead wire is desirably carried out with, for example, a ring-shaped patch that can create a small clearance with the outer surface of inner liner 9G being mounted on flange surface 23.

Next, a toroidal carcass is molded on the outside of the inner liner molded on the core body, and then, as shown in FIG. 12, the step of arranging a bead core 5G and an apex 8G on the outside is performed. Moreover, clinch rubber 4G is arranged on the outside thereof in the tire axial direction. Furthermore, a belt layer 7G, a sidewall rubber 3G and a tread rubber 2G are arranged, respectively. Although each tire component may be implemented by winding an integral extrusion type component, one having a complicated cubic shape, such as sidewall rubber 3G, for example, can be formed by the above-described strip winding method as appropriate. In this way, raw cover 1G is formed on the outside of core body N.

<Vulcanization of Tire>

Figure 13:
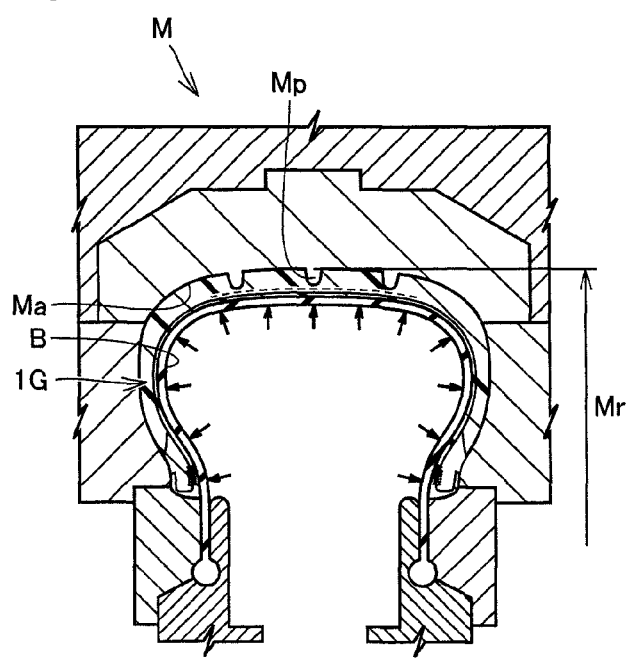
FIG. 13 is a cross sectional view of the unvulcanized tire placed in a vulcanization mold.

Next, in an embodiment of the present invention, core body N is removed from the inside of raw cover 1G, and then, as shown in FIG. 13, the vulcanization molding step of vulcanization molding raw cover 1G from which the core body has been removed with a vulcanization mold M is performed.

Above-mentioned vulcanization mold M has a molding surface Ma to come into contact with the outer surface of raw cover 1G to give it a predetermined shape. Vulcanization mold M is implemented by a widely known divided-type mold or the like. A bladder B that can expand and contract is disposed in the inside of raw cover 1G arranged in vulcanization mold M. Expanded bladder B comes into contact with the inside of raw cover 1G and strongly presses raw cover 1G against above-mentioned molding surface Ma, thereby ensuring vulcanization molding of a tire. By this action, a stretch in the radial direction and a radius stretch may occur in raw cover 1G.

If each stretch is elongated, there are various defects described above. Therefore, the vulcanization molding step is carried out such that the stretch in the radial direction and/or the radius stretch of raw cover 1G present/presents a small value. This prevents the ends of the carcass cord from varying in the vulcanization molding step, so that a pneumatic tire uniformized with high accuracy in the tire circumferential direction is reliably manufactured. Moreover, the tension which acts upon the cord of belt layer 7 is controlled to be very small, which can reduce angle variations in the belt cord during vulcanization. Thus, the cord angle can be controlled with very high accuracy. Therefore, according to the manufacturing method of the present embodiment, a pneumatic tire further having excellent uniformity can be manufactured.

The stretch in the radial direction and/or the radius stretch of raw cover 1G at the time of vulcanization molding are/is preferably not more than 2.0%, more preferably not more than 1.5%, and particularly preferably not more than 1.0%. This stretch adjustment can be performed as appropriate by, for example, changing the relative relation between the shape of outer circumferential surface 22 of core body N and the shape of molding surface Ma of vulcanization mold M. That is, the stretch is elongated by making outer circumferential surface 22 of core body N relatively smaller than molding surface Ma of vulcanization mold M. On the other hand, the stretch can be made smaller by making outer circumferential surface 22 of core body N relatively larger.

The above-mentioned "radius stretch" can be calculated by the following formula from an inner diameter $Ri$ at the position of a tire equator C of a resulting tire in the above-mentioned 5% internal pressure applied state and an outer diameter $Ro$ at the position of an equator $Nc$ of core body N.

Radius Stretch (%)=$\{(Ri-Ro) \times 100\}/Ro$

Here, above-mentioned inner diameter $Ri$ can be approximately obtained by approximately reducing the distance twice the tread thickness in tire design dimensions from an inner diameter $Mr$ of a section of mold surface Ma of vulcanization mold M where the tire equator is vulcanized (not including a projection Mp for tread groove molding).

Moreover, "the stretch in the radial direction" can be calculated by the following formula from a path length (which is a so-called peripheral length measured along the contour; the same also applies below) $Li$ in the radial direction from one bead toe to the other bead toe on the tire inside in the 5% internal pressure applied state of a resulting tire and a path length $Lo$ (shown in FIG. 12) of the outer circumferential surface of core body N.

Stretch in the Radial Direction (%)=$\{(Li-Lo) \times 100\}/Lo$

If the stretch in the radial direction exceeds 2.0%, for example, variations at the ends of the carcass cord, variations in cord change in belt layer 7, and the like are likely to increase. Then, sufficient improvement in uniformity cannot be expected. If the radius stretch exceeds 2.0%, arrangement disorder will be likely to occur in the belt cord and the like when the tread portion is strongly pressed against projection Mp for tread groove molding of vulcanization mold M.

The lower limit of stretch is 0%. That is, the tire sectional shape in the 5% internal pressure applied state of a resulting tire and raw cover 1G may have substantially the same shape, for example. This is because, in raw cover 1G molded according to the present invention, the tension of the carcass cord is uniformized on the tire circumference as compared with the case of experiencing the conventional expanding and deforming step.

However, the tension of the carcass cord in raw cover 1G is not completely uniformized on the tire circumference since manufacturing errors of the carcass ply, errors at the time of affixing the carcass ply to core body N, and the like exist. In this sense, vulcanization is desirably performed while giving a much smaller stretch to raw cover 1G than in the conventional case to equalize nonuniform tension. Accordingly, when there is a loosened carcass cord on the tire circumference in raw cover 1G, for example, the loosening can be removed at the time of vulcanization. Inversely, for a carcass cord on which a high tension is acting, moderate sliding between the carcass cord and bead core 5, for example, is caused by the stretch, so that the tension in the carcass cord can finally be made more uniform. Furthermore, by applying a moderate tension to the belt cord or the like, the above-mentioned arrangement disorder can be suppressed.

From these viewpoints, it is desirable to determine the shape of outer circumferential surface 22 of core body N such that the radius stretch and/or the stretch in the radial direction of the raw cover during vulcanization are/is more preferably not less than 0.1%, still more preferably not less than 0.2%, and particularly preferably not less than 0.3%.

It should be noted that, as another embodiment, raw cover 1G can be vulcanized together with core body N. In this case, the steps of removing and transferring raw cover 1G and the like will become unnecessary, which can prevent deformation of raw cover 1G that would occur in such steps. It is helpful to manufacture a pneumatic tire further having excellent uniformity.

<Arrangement of Inner Liner>

The inner liner in the pneumatic tire of the present invention is preferably manufactured using a polymer layer stack PL formed of a plurality of layers of a first layer and a second layer. When disposing polymer layer stack PL on a raw tire, the second layer of polymer layer stack PL, i.e., an SIS layer PL2 or an SIB layer PL3 is disposed outwardly in the direction of the tire radius in contact with carcass ply 61. With this arrangement, in the tire vulcanization step, adhesive strength can be increased between carcass 6 and SIS layer PL2 or SIB layer PL3. In the resulting pneumatic tire, the inner liner and the rubber layer of carcass ply 61 are adhered to each other in an excellent manner. Thus, the pneumatic tire can have excellent air permeability resistance and durability.

Figure 14:
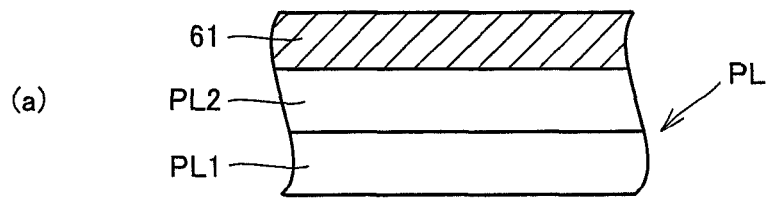
FIG. 14 is a schematic cross sectional view showing an arrangement of an inner liner and a carcass ply.
Figure 14:
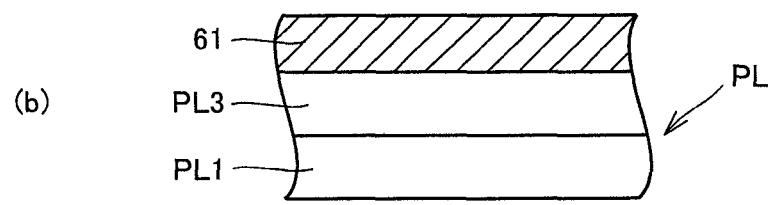
Figure 14:
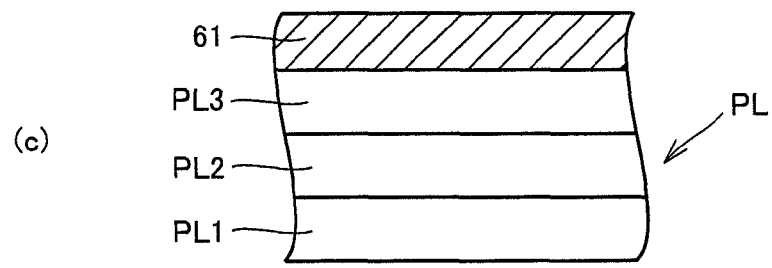
Figure 14:
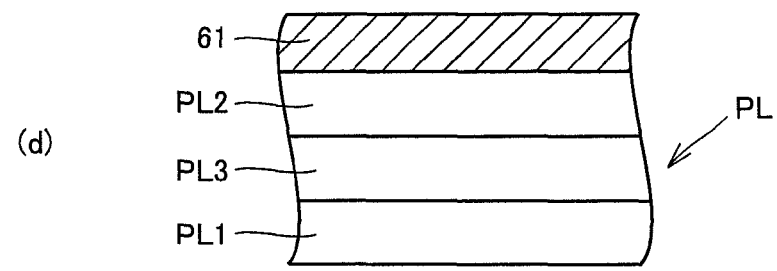

FIG. 14 shows an arrangement of the inner liner formed of the polymer layer stack in the vulcanized tire of the present invention. In FIG. 14(a), a polymer layer stack PL is formed of a layer PL1 containing the SIBS serving as the first layer, and SIS layer PL2 serving as the second layer. When applying polymer layer stack PL to the inner liner of the pneumatic tire and disposing SIS layer PL2 outwardly in the direction of the tire radius so as to bring SIS layer PL2 into contact with carcass ply 61, adhesive strength between SIS layer PL2 and carcass 61 can be increased in the step of vulcanizing the tire. Accordingly, in the resulting pneumatic tire, the inner liner and the rubber layer of carcass ply 61 are adhered to each other in an excellent manner. Thus, the pneumatic tire can have excellent air permeability resistance and durability.

In FIG. 14(b), polymer layer stack PL is formed of layer PL1 containing the SIBS serving as the first layer, and SIB layer PL3 serving as the second layer. When applying polymer layer stack PL to the inner liner of the pneumatic tire and disposing a surface of SIB layer PL3 outwardly in the direction of the tire radius so as to bring the surface of SIB layer PL3 into contact with carcass ply 61, adhesive strength between SIB layer PL3 and carcass 61 can be increased in the step of vulcanizing the tire. Accordingly, in the resulting pneumatic tire, the inner liner and the rubber layer of carcass ply 61 are adhered to each other in an excellent manner. Thus, the pneumatic tire can have excellent air permeability resistance and durability.

In FIG. 14(c), polymer layer stack PL is formed of layer PL1 containing the SIBS serving as the first layer, SIS layer PL2 and SIB layer PL3 both serving as the second layer. SIBS layer PL1, SIS layer PL2, and SIB layer PL3 are stacked on one another in this order. When applying polymer layer stack PL to the inner liner of the pneumatic tire and disposing a surface of SIB layer PL3 outwardly in the direction of the tire radius so as to bring the surface of SIB layer PL3 into contact with carcass ply 61, adhesive strength between SIB layer PL3 and carcass ply 61 can be increased in the step of vulcanizing the tire. Accordingly, in the resulting pneumatic tire, the inner liner and the rubber layer of carcass ply 61 are adhered to each other in an excellent manner. Thus, the pneumatic tire can have excellent air permeability resistance and durability.

In FIG. 14(d), polymer layer stack PL is formed of layer PL1 containing the SIBS serving as the first layer, and SIB layer PL3 and SIS layer PL2 both serving as the second layer. SIBS layer PL1, SIB layer PL3, and SIS layer PL2 are stacked on one another in this order. When applying polymer layer stack PL to the inner liner of the pneumatic tire and disposing a surface of SIS layer PL2 outwardly in the direction of the tire radius so as to bring a surface of SIS layer PL2 into contact with carcass ply 61, adhesive strength between SIS layer PL2 and carcass ply 61 can be increased in the step of vulcanizing the tire. Accordingly, the inner liner and the rubber layer of carcass ply 61 are adhered to each other in an excellent manner. Thus, the pneumatic tire can have excellent air permeability resistance and durability.

EXAMPLES

<Material of Strip>

The following thermoplastic elastomers (SIB, SIBS, and SIS) were used for manufacturing of the strip of the present invention.

[SIB]

Into a 2 L reaction container having an agitator, 589 mL of methylcyclohexane (dried with molecular sieves), 613 ml of n-butyl chloride (dried with molecular sieves), and 0.550 g of cumyl chloride were added. The reaction container was cooled to −70° C., and then 0.35 mL of α-picoline (2-methylpyridine) and 179 mL of isobutylene were added. Further, 9.4 mL of titanium tetrachloride was added to start polymerization. They were reacted with each other for 2.0 hours while stirring the solution at −70° C. Next, 59 mL of styrene was added to the reaction container, and reaction was continued for another 60 minutes. Thereafter, a large amount of methanol was added to stop the reaction. After removing a solvent and the like from the reaction solution, the polymer was dissolved with toluene and rinsed twice. This toluene solution was added to a methanol mixture to precipitate a polymer. The polymer thus obtained was dried at 60° C. for 24 hours, thereby obtaining a styrene-isobutylene diblock copolymer (the content of the styrene component: 15 mass %; weight average molecular weight: 70,000).

[SIBS]

"SIBSTAR 102T (Shore A hardness: 25; the content of the styrene component: 25 mass %; weight average molecular weight: 100,000)" provided by Kaneka Corporation was used.

[SIS]

D1161JP (the content of the styrene component: 15 mass %; weight average molecular weight: 150,000) provided by Kraton Polymers was used.

<Method for Manufacturing Inner Liner>

The SIBS and the SIS were implemented by commercially available pellets and the SIB obtained by the above-described manufacturing method was used. They were blended by the following formulation with a Banbury mixer and a twin-screw extruder.

Next, in order to extrusion mold a thermoplastic elastomer strip, the first layer and the second layer were used to produce a ribbon-shaped sheet (thickness: 0.3 mm) of two-layer structure by coextrusion with a die extruder shown in FIGS. 2 and 3. The extrusion conditions are as follows:

Twin-screw extruder (screw diameter: φ50 mm; L/D: 30; cylinder temperature: 220° C.)

T-die extruder (screw diameter: φ80 mm; L/D: 50; die gap width: 500 mm; cylinder temperature: 220° C.)

This sheet was passed through nip roller 14A and die roller 14B to manufacture strip 12A with the ear portions of predetermined shape formed on the opposite ends. It should be noted that ribbon-shaped sheet 12 has a multilayer structure obtained by coextruding thermoplastic elastomers of the first layer and the second layer using the above-mentioned extruder. Then, the strip was passed by a free roller 18 and detached from the die roller to obtain strip 12A having a sectional structure shown in FIG. 4. Here, strip 10 has widths (W0, WA) and thickness (T1) and ear portions 10B have width (W2) and thickness (T2) as shown in Table 3.

The above-described strip was wound on the outer circumferential surface of the core body as shown in FIG. 8 such that overlapping portions have a width of 18 mm, thereby forming a 0.3-mm-thick inner liner with adjacent ear portions of the strip forming junctions together.

TABLE 1

| | | Comparative Example Formulation 1 | Example Formulation 1 | Example Formulation 2 | Example Formulation 3 | Example Formulation 4 | Example Formulation 5 | Example Formulation 6 |
|---|---|---|---|---|---|---|---|---|
| | | | | Formulation Example of First Layer | | | | |
| SIBS | (Mass %) | 100 | 100 | 70 | 30 | 70 | 30 | 30 |
| IIR | (Mass %) | | | 30 | 70 | 30 | 70 | |
| NR | (Mass %) | | | | | | | 70 |
| Tackifier | (Part by Mass) | | 10 | | | 10 | 10 | 10 |
| CB | (Part by Mass) | | | 60 | 60 | 60 | 60 | 60 |
| ZnO | (Part by Mass) | | | 4.0 | 4.0 | 4.0 | 4.0 | 4.0 |
| Stearic Acid | (Part by Mass) | | | 2.0 | 2.0 | 2.0 | 2.0 | 2.0 |
| Antioxidant | (Part by Mass) | | | 0.2 | 0.2 | 0.2 | 0.2 | 0.2 |
| Vulcanization Accelerator | (Part by Mass) | | | 2.0 | 2.0 | 2.0 | 2.0 | 2.0 |
| Sulfur | (Part by Mass) | | | 1.0 | 1.0 | 1.0 | 1.0 | 1.0 |

TABLE 2

| Formulation Example of Second Layer | | Comparative Example Formulation 2 | Comparative Example Formulation 3 | Example Formulation 7 | Example Formulation 8 |
|---|---|---|---|---|---|
| SIS | (Mass %) | 100 | | 50 | 50 |
| SIB | (Mass %) | | 100 | | |
| SIBS | (Mass %) | | | 50 | |
| NR | (Mass %) | | | | 50 |
| CB | (Part by Mass) | | | | 60 |
| ZnO | (Part by Mass) | | | | 4.0 |
| Stearic Acid | (Part by Mass) | | | | 2.0 |
| Antioxidant | (Part by Mass) | | | | 0.2 |
| Vulcanization Accelerator | (Part by Mass) | | | | 2.0 |
| Sulfur | (Part by Mass) | | | | 1.0 |

(Note 1)
IIR: "Exxon Chlorobutyl 1066" provided by Exxon Mobil Corporation
(Note 2)
NR: TSR20
(Note 3)
Tackifier: "ARKON P140 (C9 petroleum resin, having a softening point of 140° C. and having a weight average molecular weight of 70,000) provided by Arakawa Chemical Industries, Ltd.
(Note 4)
Carbon Black (CB): "SEAST V (N660, N2SA: 27 m2/g)" provided by Tokai Carbon Co., Ltd.
(Note 5)
Zinc oxide: "Zinc White No. 1" provided by Mitsui Mining and Smelting Co., Ltd.
(Note 6)
Stearic Acid: "Stearic Acid LUNAC S30" provided by Kao Corp.
(Note 7)
Antioxidant: "NOCRAC 6C" (N-(1,3-dimethylbutyl)-N'-phenyl-p-phenylenediamine) provided by Ouchi Shinko Chemical
(Note 8)
Vulcanization Accelerator: "NOCCELER DM" (di-2-benzothiazolyldisulfide) provided by Ouchi Shinko Chemical
(Note 9)
Sulfur: "Sulfur Powder" provided by TSURUMI CHEMICAL INDUSTRIES CO. LTD.

TABLE 3

| | | Comparative Example 1 | Comparative Example 2 | Comparative Example 3 | Example 1 | Example 2 | Example 3 | Example 4 |
|---|---|---|---|---|---|---|---|---|
| Strip Specification | Formulation of First Layer | Comparative Formulation 1 | Comparative Formulation 1 | Comparative Formulation 1 | Example Formulation 1 | Example Formulation 1 | Example Formulation 1 | Example Formulation 1 |
| | Formulation of Second a Layer | | Comparative Formulation 2 | | | | Example Formulation 7 | Example Formulation 8 |
| | Formulation of Second b Layer | | | Comparative Formulation 3 | | | | |
| | T1 (or TA) (mm) | 1 | 1.5 | 1.5 | 0.05 | 1.0 | 0.05 | 0.05 |
| | T2 (mm) | | 0.6 | 0.6 | 0.02 | 0.5 | 0.02 | 0.02 |
| | W2 | | 0.4 | 0.4 | 0.50 | 5.0 | 0.50 | 0.50 |
| | W0 (or WA) (mm) | 40 | 40 | 40 | 40 | 40 | 40 | 40 |

TABLE 3-continued

| Performance Evaluation | (a) Tackiness to former | 100 | 100 | 100 | 120 | 120 | 120 | 120 |
|---|---|---|---|---|---|---|---|---|
| | (b) Adhesion Property to Carcass | 100 | 99 | 99 | 110 | 110 | 140 | 180 |
| | (c) Air-in | C | B | B | A | A | A | A |
| | (d) LFV | 100 | 99 | 99 | 105 | 103 | 106 | 106 |
| | (d) RFV | 100 | 98 | 98 | 105 | 103 | 107 | 108 |
| | (e) Flection Crack Growth | 100 | 96 | 96 | 110 | 110 | 140 | 150 |
| | Total Judgment | B | B | B | A | A | A | A |

| | | Example 5 | Example 6 | Example 7 | Example 8 | Example 9 | Example 10 | Example 11 |
|---|---|---|---|---|---|---|---|---|
| Strip Specification | Formulation of First Layer | Example Formulation 2 | Example Formulation 2 | Example Formulation 3 | Example Formulation 4 | Example Formulation 5 | Example Formulation 5 | Example Formulation 6 |
| | Formulation of Second a Layer | | Example Formulation 7 | Example Formulation 7 | Example Formulation 7 | Example Formulation 7 | Example Formulation 8 | Example Formulation 7 |
| | Formulation of Second b Layer | | | | | | | |
| | T1 (or TA) (mm) | 0.05 | 0.05 | 0.05 | 0.05 | 0.05 | 0.05 | 0.05 |
| | T2 (mm) | 0.02 | 0.02 | 0.02 | 0.02 | 0.02 | 0.02 | 0.02 |
| | W2 | 0.50 | 0.50 | 0.50 | 0.50 | 0.50 | 0.50 | 0.50 |
| | W0 (or WA) (mm) | 40 | 40 | 40 | 40 | 40 | 40 | 40 |
| Performance Evaluation | (a) Tackiness to former | 130 | 130 | 150 | 138 | 158 | 158 | 148 |
| | (b) Adhesion Property to Carcass | 110 | 140 | 140 | 140 | 140 | 180 | 130 |
| | (c) Air-in | A | A | A | A | A | A | A |
| | (d) LFV | 106 | 110 | 111 | 112 | 115 | 115 | 115 |
| | (d) RFV | 105 | 111 | 113 | 113 | 118 | 119 | 118 |
| | (e) Flection Crack Growth | 110 | 140 | 140 | 140 | 140 | 150 | 135 |
| | Total Judgment | A | A | A | A | A | A | A |

<Manufacturing of Tire>

A pneumatic tire of tire size of 195/65R15 was prototyped using an inner liner obtained by molding a strip based on the specifications shown in Table 1 on a drum. It should be noted that press vulcanization was performed for 20 minutes at 170° C. Then, the tire was cooled for 3 minutes at 100° C. without removing the tire from the vulcanization mold, and then was removed from the vulcanization mold. It should be noted that each Example is a strip provided with ear portions.

In each Comparative Example and Example, the core body has an outer circumferential surface resembling the tire inner surface shape when 5% of internal pressure is applied to the tire. Furthermore, the radius stretch of each Comparative Example and Example is 1.0%, and the stretch in the radial direction is 1.0%.

<Method for Evaluating Tire Performance>

For the pneumatic tires of the Examples and the Comparative Examples shown in Table 1, performance evaluation was conducted by the following methods.

<Unvulcanization Tackiness>

An unvulcanized sheet of the first layer and a former were bonded together and held for 30 seconds at 100 gf. Then, the force by which they were detached was measured as unvulcanization tackiness. According to the below-described formula, vulcanization tackiness in each Example was expressed in an index with Comparative Example 1 being regarded as a reference. It should be noted that as the index of the unvulcanization tackiness is larger, the unvulcanization tackiness is higher.

The Index of the Unvulcanization Tackiness=(the Unvulcanization Tackiness of Each Example)/(the Unvulcanization Tackiness of Comparative Example 1)×100

<Vulcanization Adhesion Strength>

Unvulcanized rubbers of the first layer and the carcass ply layer as well as the second layer and the carcass ply were bonded together. Then, they were vulcanized at 170° C. for 20 minutes. In this way, samples for measurement of vulcanization adhesion strength were fabricated. Vulcanization adhesion strength was measured by measuring detachment force using a tension tester. According to the below-described formula, vulcanization adhesion strength for each blend was expressed in an index with Comparative Example 1 being regarded as a reference. It should be noted that as the index of the vulcanization adhesion strength is larger, the vulcanization adhesion strength is higher.

The Index of the Vulcanization Adhesion Strength= (the Vulcanization Adhesion Strength of Each Example)/(the Vulcanization Adhesion Strength of Comparative Example 1)×100

<Air-In Performance>

The inside of a vulcanized tire was checked by appearance and evaluated as follows:

A: In appearance, per tire, the number of air bubbles with a diameter not more than 5 mm was 0, and the number of air bubbles with a diameter exceeding 5 mm was 0.

B: In appearance, per tire, the number of air bubbles with a diameter not more than 5 mm was 1 to 3, and the number of air bubbles with a diameter exceeding 5 mm was 0.

C: In appearance, per tire, the number of air bubbles with a diameter not more than 5 mm was 4 or more, and the number of air bubbles with a diameter exceeding 5 mm was 1 or more.

<Uniformity (LFV, RFV)>

In conformity with the uniformity test conditions of JASOC607:2000, the lateral force variation (LFV) and the radial force variation (RFV) were measured. In each result, an average value (N) of 20 tires was calculated, and a relative value was indicated in an index with Comparative Example 1 being regarded as 100. As the index is larger, the uniformity is more excellent.

The Uniformity Index=(Uniformity of Comparative Example 1/Uniformity of Each Example)×100

\<Flection Crack Growth Test\>

In endurance traveling test of trial tire, crack and detachment state of the inner liner was evaluated. Each trial tire was assembled to a JIS specification rim 15×6JJ. The tire internal pressure was set at 150 KPa, which was lower internal pressure than normal internal pressure. The load was set at 600 kg. The speed was set at 100 km/h. The travel distance was set at 20,000 km. Inside of the tire was observed to measure the number of cracks and detachments, which is indicated by a relative value with reference to Comparative Example 1.

The Index of the Crack Growth Resistance=(the Number of Cracks in Comparative Example 1/the Number of Cracks in Each Example)×100

\<Total Judgment\>

A tire that satisfied all of the following conditions (a) to (e) was rated A as a total judgment:
(a) Unvulcanization tackiness not less than 100;
(b) Vulcanization adhesion strength not less than 100;
(c) Air-in performance rated A;
(d) Uniformity not less than 100; and
(e) Flection crack growth not less than 100.

A tire that satisfied the following conditions in any one of (a) to (e) below was rated B or C as a total judgment. When a plurality of judgments applied, one of lower evaluation was adopted.
(a) Unvulcanization tackiness less than 100;
(b) Vulcanization adhesion strength less than 100;
(c) Air-in performance rated B or C;
(d) Uniformity less than 100; and
(e) Flection crack growth less than 100.

\<Tire Evaluation Results\>

Examples 1, 2 and 5 are examples where the strip is only formed of the first layer. Examples 1 to 4 and Examples 8 to 11 are examples where the first layer contains a tackifier. Examples 5 to 7 are examples where the first layer contains IIR. It is recognized that Examples of the present invention excels Comparative Example 1 in all of unvulcanization tackiness, vulcanization adhesion strength, uniformity, and flection crack growth test.

INDUSTRIAL APPLICABILITY

The strip and the method for manufacturing the same of the present invention can be applied to a pneumatic tire for track/bus, a pneumatic tire for heavy vehicle, or the like, besides a pneumatic tire for passenger car.

REFERENCE SIGNS LIST

1: pneumatic tire; 2: tread portion; 3: sidewall portion; 4: bead portion; 5: bead core; 6: carcass ply; 7: belt layer; 8: bead apex; 9: inner liner; 10: strip; 11: strip manufacturing device; 12: sheet; 13: extruder; 14A, 14B: die roller; 15: screw shaft; 16: extrusion port; 17: mouthpiece; 18: free roller; PL: polymer layer stack.

The invention claimed is:

1. A strip to be wound on an outer circumferential surface of a core body in a circumferential direction to form an inner liner having a shape close to a finished sectional shape of a tire,
    said strip consisting of a single layer arranged in a tire innermost layer, said layer being a thermoplastic elastomer composition
    wherein a polymer component of said thermoplastic elastomer composition contains 5 mass % to 40 mass % of a styrene-isobutylene-styrene block copolymer and 60 mass % to 95 mass % of a natural rubber, and
    wherein said thermoplastic elastomer composition further contains a tackifier in a range of 0.1 to 100 parts by mass with respect to 100 parts by mass of said polymer component, and
    said strip having a strip main body having a thickness (T1) of 0.02 mm to 1.0 mm and ear portions formed on opposite sides of the strip main body, the ear portions having a thickness (T2) smaller than said thickness (T1) and a width (W2) of 0.5 mm to 5.0 mm.

2. A method for manufacturing the strip as defined in claim 1, comprising the steps of:
    (a) extruding a thermoplastic elastomer by an extruder having an extruder main body and an extrusion head to form a sheet having a horizontally-long rectangular cross section;
    (b) passing the sheet between a die roller and a nip roller to transfer a shape of said die roller on said sheet to form the strip having the ear portions on ends of the strip; and
    (c) detaching said strip from said die roller.

3. A strip to be wound on an outer circumferential surface of a core body in a circumferential direction to form an inner liner having a shape close to a finished sectional shape of a tire,
    said strip consisting of composite layers of a first layer arranged in a tire innermost layer and a second layer disposed adjacently to a carcass ply and made of a thermoplastic elastomer composition,
    said first layer being a thermoplastic elastomer composition containing 5 mass % to 40 mass % of a styrene-isobutylene-styrene block copolymer, 60 mass % to 95 mass % of a natural rubber, and a tackifier in a range of 0.1 part by mass to 100 parts by mass with respect to 100 parts by mass of the copolymer and rubber components,
    said second layer consisting essentially of a linear styrene-isobutylene block copolymer with a styrene component content of 10 mass % to 35 mass %, and
    said strip having a strip main body having a thickness (T1) of 0.02 mm to 1.0 mm and ear portions formed on opposite sides of the strip main body, the ear portions having a thickness (T2) smaller than said thickness (T1) and a width (W2) of 0.5 mm to 5.0 mm.

4. A method for manufacturing the strip as defined in claim 3, comprising the steps of:
    (a) extruding a thermoplastic elastomer by an extruder having an extruder main body and an extrusion head to form a sheet having a horizontally-long rectangular cross section;
    (b) passing the sheet between a die roller and a nip roller to transfer a shape of said die roller on said sheet to form the strip having the ear portions on ends of the strip; and
    (c) detaching said strip from said die roller.

5. A method for manufacturing a pneumatic tire, in which a strip is wound of an outer circumferential surface of a core body along a circumferential direction with its side edge offset to mold an inner liner having a shape close to a finished sectional shape or a tire, wherein
    (a) said strip consisting of a single layer arranged in a tire innermost layer and made of a thermoplastic elastomer composition wherein a polymer component of said thermoplastic elastomer composition contains 5 mass % to 40 mass % of a styrene-isobutylene-styrene block copolymer and 60 mass % to 95 mass % of a natural rubber, and wherein said thermoplastic elastomer composition further contains a tackifier in a range of 0.1 to 100 parts by mass with respect to 100 parts by mass of said polymer component, and (b) said strip has a strip main body having a thickness (T1) of 0.02 to 1.0 mm and ear portions formed on opposite sides of the strip main body, the ear portions having a thickness (T2) smaller than said thickness (T1) and a width (W2) of 0.5 mm to 5.0 mm.

6. A method for manufacturing a pneumatic tire, in which a strip is wound of an outer circumferential surface of a core body along a circumferential direction with its side edge offset to mold an inner liner having a shape close to a finished sectional shape or a tire, wherein (a) said strip consisting of composite layers of a first layer arranged in a tire innermost layer and a second layer disposed adjacently to a carcass ply and made of a thermoplastic elastomer composition, and (b) said strip has a strip main body having a thickness (T1) of 0.02 to 1.0 mm and ear portions formed on opposite sides of the strip main body, the ear portions having a thickness (T2) smaller than said thickness (T1) and a width (W2) of 0.5 mm to 5.0 mm, wherein said first layer is a thermoplastic elastomer composition containing 5 mass % to 40 mass % of a styrene-isobutylene-styrene block copolymer, 60 mass to 95 mass % of a natural rubber, and a tackifier in a range of 0.1 part by mass to 100 parts by mass with respect to 100 parts by mass of the copolymer and rubber components, and said second layer consists essentially of a styrene-isobutylene block copolymer.

7. The method for manufacturing a pneumatic tire according to claim 5, wherein said core body has an outer circumferential surface resembling a tire inner surface shape when 5% of internal pressure is applied to the tire.

8. The method for manufacturing a pneumatic tire according to claim 5, wherein said core body has an outer circumferential surface smaller than a tire inner surface shape when 5% of internal pressure is applied to the tire.

9. The method for manufacturing a pneumatic tire according to claim 5, comprising:

the step of molding the inner liner on the outer circumferential surface of said core body using said strip, and then assembling with another tire component to mold an unvulcanized tire; and the step of vulcanizing of removing the unvulcanized tire from said core body and inputting the unvulcanized tire into a vulcanization mold for vulcanization molding.

10. The method for manufacturing a pneumatic tire according to claim 9, wherein in said step of vulcanizing, the unvulcanized tire is vulcanized with 0.1% to 2.0% of a radius stretch by expansion of a bladder disposed on an inner side of the unvulcanized tire.

11. The method for manufacturing a pneumatic tire according to claim 9, wherein in said step of vulcanizing, the unvulcanized tire is vulcanized with 0.1% to 2.0% of a stretch in a radial direction by expansion of a bladder disposed on an inner side of the unvulcanized tire.

12. The method for manufacturing a pneumatic tire according to claim 5, comprising the steps of:

molding an unvulcanized tire molded using said strip on the outside of said core body; and inputting said unvulcanized tire and said core body together into a vulcanization mold and heating said vulcanization mold and said core body, thereby vulcanizing the tire.

13. The method for manufacturing a pneumatic tire according to claim 6, wherein said core body has an outer circumferential surface resembling a tire inner surface shape when 5% of internal pressure is applied to the tire.

14. The method for manufacturing a pneumatic tire according to claim 6, wherein said core body has an outer circumferential surface smaller than a tire inner surface shape when 5% of internal pressure is applied to the tire.

15. The method for manufacturing a pneumatic tire according to claim 6, comprising:

the step of molding the inner liner on the outer circumferential surface of said core body using said strip, and then assembling with another tire component to mold an unvulcanized tire; and the step of vulcanizing of removing the unvulcanized tire from said core body and inputting the unvulcanized tire into a vulcanization mold for vulcanization molding.

16. The method for manufacturing a pneumatic tire according to claim 15, wherein in said step of vulcanizing, the unvulcanized tire is vulcanized with 0.1% to 2.0% of a radius stretch by expansion of a bladder disposed on an inner side of the unvulcanized tire.

17. The method for manufacturing a pneumatic tire according to claim 15, wherein in said step of vulcanizing, the unvulcanized tire is vulcanized with 0.1% to 2.0% of a stretch in a radial direction by expansion of a bladder disposed on an inner side of the unvulcanized tire.

18. The method for manufacturing a pneumatic tire according to claim 6, comprising the steps of:

molding an unvulcanized tire molded using said strip on the outside of said core body; and inputting said unvulcanized tire and said core body together into a vulcanization mold and heating said vulcanization mold and said core body, thereby vulcanizing the tire.

* * * * *